US012665428B2

(12) United States Patent
Knobloch et al.

(10) Patent No.: US 12,665,428 B2
(45) Date of Patent: Jun. 23, 2026

(54) METHOD FOR OPERATING A POWER SUPPLY PLANT, AND POWER SUPPLY PLANT

(71) Applicant: SMA Solar Technology AG, Niestetal (DE)

(72) Inventors: Andreas Knobloch, Kassel (DE); Christian Hardt, Kassel (DE); Mats Bernsdorff, Kassel (DE); Daniel Premm, Kaufungen (DE)

(73) Assignee: SMA Solar Technology AG, Niestetal (DE)

( * ) Notice: Subject to any disclaimer, the term of this patent is extended or adjusted under 35 U.S.C. 154(b) by 602 days.

(21) Appl. No.: 18/097,535

(22) Filed: Jan. 17, 2023

(65) Prior Publication Data
US 2023/0187942 A1     Jun. 15, 2023

Related U.S. Application Data

(63) Continuation of application No. PCT/EP2021/070191, filed on Jul. 19, 2021.

(30) Foreign Application Priority Data

Jul. 17, 2020     (DE) ..................... 10 2020 119 039.5

(51) Int. Cl.
*H02J 3/38*          (2026.01)
*G05B 19/042*          (2006.01)
(Continued)

(52) U.S. Cl.
CPC ............. *H02J 3/38* (2013.01); *G05B 19/042* (2013.01); *H02J 3/16* (2013.01); *H02J 7/82* (2026.01); *G05B 2219/2639* (2013.01)

(58) Field of Classification Search
CPC ... H02J 3/38; H02J 3/16; H02J 7/0048; G05B 19/042; G05B 2219/2639; Y02E 10/56
See application file for complete search history.

(56) References Cited

U.S. PATENT DOCUMENTS 9,859,828 B2     1/2018  Tarnowski et al.
11,862,979 B1 *   1/2024  Ali ......................... H02J 3/388
                (Continued)

FOREIGN PATENT DOCUMENTS

DE     102004048341 A1     4/2006
DE     102009017939 A1     11/2010
                (Continued)

OTHER PUBLICATIONS

International Search Report dated Oct. 25, 2021 in connection with PCT/EP2021/070191.

*Primary Examiner* — Charles Cai
(74) *Attorney, Agent, or Firm* — Eschweiler & Potashnik, LLC

(57)          ABSTRACT

In a method for operating a power supply plant having a plurality of inverters and a plant controller connected to the inverters for communication, the power supply plant has a grid connection, which is connected to an AC voltage grid. Via the grid connection, the inverters exchange electrical interchange powers with the AC voltage grid such that the power supply plant exchanges a total interchange power, composed of the respective electrical interchange powers, with the AC voltage grid. By means of a respective regulator, the inverters adjust their respective interchange powers depending on a respective deviation of a voltage profile of a grid voltage from a respective reference profile with respect to a respective reference frequency and/or depending on a respective voltage amplitude differential between a respective grid voltage and a respective reference voltage. The plant controller influences the regulators of the inverters (Continued)

depending on a power differential between the total inter-change power and a specified interchange power. A power supply plant according to the application is designed to carry out this method.

28 Claims, 12 Drawing Sheets

(51) Int. Cl.
 *H02J 3/16* (2026.01)
 *H02J 7/82* (2026.01)

(56) References Cited

U.S. PATENT DOCUMENTS

| | | | |
|---|---|---|---|
| 2003/0039132 A1* | 2/2003 | Engler | H02M 7/493 |
| | | | 363/71 |
| 2008/0073912 A1 | 3/2008 | Fortmann et al. | |

| | | | |
|---|---|---|---|
| 2010/0025994 A1 | 2/2010 | Cardinal et al. | |
| 2010/0268393 A1 | 10/2010 | Fischle et al. | |
| 2012/0235498 A1* | 9/2012 | Johnson | H02J 3/16 |
| | | | 363/71 |
| 2013/0168963 A1 | 7/2013 | Garcia | |
| 2014/0306533 A1* | 10/2014 | Paquin | H02J 3/46 |
| | | | 307/43 |
| 2016/0268818 A1 | 9/2016 | Shim | |
| 2016/0336753 A1* | 11/2016 | Kam | H02J 3/16 |
| 2018/0122726 A1 | 5/2018 | Koga et al. | |
| 2021/0066925 A1* | 3/2021 | Anichkov | H02P 9/48 |
| 2021/0265841 A1* | 8/2021 | Brombach | H02J 3/38 |
| 2021/0313809 A1 | 10/2021 | Richter et al. | |
| 2023/0089057 A1* | 3/2023 | Kudo | H02J 9/062 |
| | | | 700/286 |

FOREIGN PATENT DOCUMENTS

| | | |
|---|---|---|
| DE | 102018132645 A1 | 6/2020 |
| EP | 1286444 B1 | 10/2006 |
| EP | 2161444 A2 | 3/2010 |

* cited by examiner

METHOD FOR OPERATING A POWER SUPPLY PLANT, AND POWER SUPPLY PLANT

CROSS REFERENCE TO RELATED APPLICATIONS

This application is a continuation of International Patent Application Number PCT/EP2021/070191, filed on Jul. 19, 2021, which claims priority to German Patent Application number 10 2020 119 039.5, filed on Jul. 17, 2020, and is hereby incorporated by reference in its entirety.

FIELD

The disclosure relates to a method for operating a power supply plant, and a power supply plant.

BACKGROUND

Conventional power supply plants, for example, thermally operated power plants, comprise grid-synchronous rotating flywheel masses of synchronous generators or turbines and the respective drive train. The power supply plants exchange electrical power with an electrical AC voltage grid, wherein the entire flywheel mass of the plants in the grid contributes significantly to the stabilization of the AC voltage grid. For example, the inertia of this flywheel mass causes an inertia of the rotating voltage space vector of the power supply plants due to the rotational energy stored therein, such that in the event of phase jumps and/or frequency changes of the voltage space vector in the AC voltage grid, an instantaneous power change of the power supply plants takes place, which is caused, for example, by inductive effects and a phase angle differential between the voltage space vector of the flywheel mass and the voltage space vector of the grid voltage. As a result, a so-called instantaneous reserve is provided and the rate of change of the grid frequency of the AC voltage grid is limited, in the event that power imbalances occur between the supply and the discharge of electrical power, i.e., between generation and consumption in the AC voltage grid.

The energy exchanged as an instantaneous reserve power between the power supply plant and the AC voltage grid is removed from or supplied to the rotating mass by decelerating or accelerating the flywheel mass, wherein the power exchanged and the energy exchanged are being limited by the physical characteristics of the power supply plant as a whole. The provision of the instantaneous reserve ends as soon as the voltage space vector of the flywheel mass has synchronized with the voltage space vector of the grid and its rotation frequency has matched to the grid frequency, i.e., in particular as soon as a drifting away of the grid frequency is stopped, for example after the power equilibrium has been eliminated by further frequency retention mechanisms or a grid self-regulating effect.

In contrast, power supply plants which exchange electrical power with the AC voltage grid via power-electronic power converters, such as photovoltaic plants, wind power plants or grid-connected energy storages, generally have no rotating masses and thus no mechanical inertia, virtually no mechanical storage capability, and no significant overcurrent capability. The power-electronic power converters of such power supply plants, in particular inverters, may be set up to exchange electrical power with an existing AC voltage grid or can themselves set up a microgrid.

An inverter, which sets up a microgrid, specifies the AC voltage in the microgrid with respect to amplitude and frequency itself and feeds a current into the microgrid, which is suitable for keeping the amplitude and frequency of the AC voltage in the microgrid within respective permissible value ranges. For this purpose, a so-called droop regulation may be used, as is described, for example, in WO 2018/122726 A1. In this voltage-impressing and thus grid-forming droop regulation, the current exchanged or respectively power exchanged between inverter and microgrid is adjusted on the basis of an f(P) characteristic curve such that a power imbalance in the microgrid and thus a frequency deviation or a phase jump of the grid voltage leads to a counteracting reaction of the inverter. Specifically, for example, the power fed into the grid increases when there is a power deficit and thus an underfrequency in the microgrid. The object is to achieve a power equilibrium in the microgrid in order to be able to operate the microgrid within normatively permissible limits.

As a power converter-based method for application in an inverter for a microgrid, a droop regulation with low-pass filter in the f(P) path is known, for example, from EP 1 286 444 B1. This control method relates to the implementation in parallel-connected and inductively coupled inverters, which are connected to a common supply line via grid coupling inductances. Here, each inverter has a control loop in which the frequency of the output voltage is derived from the active power, taking into account a preselected frequency statics, wherein a value for the phase of the output voltage may also be derived from the active power.

An inverter, which exchanges electrical power with an existing AC voltage grid, by operating in a current-impressing manner, follows the AC voltage in the AC voltage grid and generates a grid-compliant alternating current, the frequency of which corresponds largely to the current frequency of the AC voltage of the AC voltage grid and the amplitude and thus power of which may be oriented to external boundary conditions. For example, the alternating current fed in may be adjusted based on a desired interchange power of the power supply plant, for example, a charging or discharging power of a battery as a direct current source, and/or based on the current properties of the connected direct current source, in the case of a PV generator as a direct current source, for example, for utilizing the maximum available generator power. In addition, the exchanged active power may be adjusted in a so-called P(f) regulation by means of a power-frequency characteristic curve depending on the deviation of the grid frequency from a nominal frequency and/or the exchanged reactive power may be adjusted in a reactive power regulation by means of a reactive power-voltage characteristic curve depending on a deviation of the grid voltage from a nominal voltage.

Inverters generally have fast dynamics, i.e., they are able to adjust their output voltage, output current and, if necessary, further parameters with a high clock frequency significantly greater than one kilohertz and correspondingly small time constants below one millisecond. The application of the droop regulation in an inverter results in a quasi-instantaneous power change in the event of grid events, for example, in the event of frequency deviations or phase jumps. The proportional power-frequency characteristic curve of the droop regulation means that, when a phase angle differential occurs, i.e., in particular in the case of a power change due to a deviation of the grid frequency relative to a nominal frequency, within less than one period of the AC voltage, a new operating point with a changed frequency and thus a stabilized phase angle differential and resulting interchange power is established. In the P(f) regulation, a specific determination of the grid frequency is generally necessary first, for example. by means of a phase-locked loop (PLL), so that an inverter with a P(f) regulation under certain circumstances may not respond as desired to phase jumps as well as, due to the principle, with a delay to a change of the interchange power and/or the output current to frequency drifts.

If the grid frequency deviates from the nominal frequency, but is otherwise constant, a likewise constant power deviation from the power at grid frequency equal to the nominal frequency occurs both with droop regulation and with conventional current-impressing P(f) regulation. In this respect, droop regulation and P(f) regulation have the character of a frequency retention reserve, a so-called primary control reserve. This also applies analogously to the provision of a constant reactive power in the event of a constant voltage deviation of the grid voltage from the nominal voltage. However, when behaving as an instantaneous reserve, it is often desirable that the instantaneous reserve power, i.e., the power exchanged with the AC voltage grid to provide the instantaneous reserve, decays to its original value before a grid event, i.e., before a change in the grid voltage angle or grid frequency, and assumes a value specified in another way, e.g., higher-level.

U.S. Pat. No. 9,859,828 B2 describes a wind power plant combined with energy storages, including wind turbine generators and a plant controller, which exchange electrical power with an AC grid. The wind power plant is designed to act in a grid-supporting manner by regulating the power exchanged.

US 2016/0268818 A1 describes a power supply system. A system controller adjusts a droop characteristic curve for a plurality of batteries. A battery controller controls the charging and discharging of the plurality of batteries based on the droop characteristic curve.

SUMMARY

The disclosure is directed to providing a method for operating a power supply plant and an inverter in a power supply plant, which provides an instantaneous reserve, for example, by an inertia, and thus has a grid-serving effect. The disclosure is further directed to providing a power supply plant which has a voltage and/or frequency supporting effect, for example, by providing an instantaneous reserve.

In a method for operating a power supply plant having a plurality of inverters, a plant controller, which is communicatively connected to the inverters, and a grid connection via which the power supply plant may be connected to an AC voltage grid, the inverters exchange electrical interchange powers with the AC voltage grid via the grid connection so that the power supply plant exchanges a total interchange power, composed of the respective interchange powers of the inverters, with the AC voltage grid. Here, the inverters adjust their respective interchange powers using a respective regulator circuit as a function of a respective voltage profile deviation of a voltage profile of a grid voltage from a respective reference profile having a reference phase angle and/or being based on a respective reference frequency. Alternatively, or additionally, the inverters adjust their respective interchange powers using a respective regulator circuit as a function of a respective voltage amplitude differential between a respective grid voltage and a respective reference voltage. The plant controller influences the regulator circuits of the inverters as a function of a power differential between the total interchange power and a specified interchange power.

By decoupling the control of the respective interchange power by the inverter itself according to the disclosure and the superimposed influencing of the regulator circuit of the inverters by the plant controller, it is made possible to dynamically adjust the total interchange power of the power supply plant on the one hand at the level of the inverters, for example, for grid support in the event of a transient deviation of grid parameters from corresponding nominal values, and on the other hand to pursue a higher level objective at the level of the whole power supply plant, for example, the optimal utilization of an energy source and/or energy sink of the power supply plant. For example, a high degree of accuracy may be achieved in terms of the grid-supporting power contributions made at the grid connection point, for example, the instantaneous reserve power held in reserve and actually provided.

In one embodiment, the inverters are configured as storage inverters and each have a storage connection for connecting an energy storage system with energy storage and energy storage management, for example, a battery system with battery and battery management. Electrical power may be drawn from the energy storage of the energy storage system, e.g., a battery or a double-layer capacitor (ultracap or supercap), as needed to feed into the AC voltage grid by discharging the energy storage. When electrical power is taken from the AC voltage grid, respective energy storage of the storage inverters may be charged.

In one embodiment, the inverters are configured as inverters which optionally have a connection for a photovoltaic plant (PV plant). If necessary, electrical power for feeding into the AC voltage grid may be generated via the PV plant, wherein the generated power may be varied between an irradiation-dependent maximum possible power and zero, and the PV plant may additionally serve as a sink by drawing electrical power from the AC voltage grid and feeding it back into the PV plant.

In one embodiment, the inverters measure the grid voltage of the AC voltage grid via respective measuring circuits or devices. The voltage profile of the grid voltage maps the temporal profile of the measured values of the grid voltage and may comprise a phase space vector having a phase angle and a rotational frequency. The grid frequency and/or the voltage amplitude may then be determined by the respective inverters, for example, by their respective regulator circuits, from the voltage profile, for example, by a phase-locked loop (in short: PLL).

In one embodiment, the respective regulator circuits of the inverters comprise a reference frequency and/or a reference voltage which are used to specify a reference profile of the output voltage of the respective inverter to be adjusted with respect to the reference frequency and/or the reference voltage. In this case, the reference profile may have, for example, the reference frequency or a frequency deviating from the reference frequency by a control amount, wherein the control amount may depend on the interchange power of the respective inverter in a droop regulation.

The described method provides a power converter-based instantaneous reserve by power supply plants, for example, by PV plants or energy storage plants. In the process, the respective regulator circuits of the inverters, which are operated in a voltage-setting and/or current-setting manner and adjust their respective interchange powers as a function of the voltage deviation and/or the voltage amplitude differential between the grid voltage and the respective inverter nominal values, are supplemented by a higher-level plant controller. The plant controller influences the regulator circuits of a plurality of inverters of a power supply plant, for example, by specifying and/or modifying at least one parameter of the regulator circuits and/or by transmitting power values at the grid connection, which are used within the regulator circuits of the inverters to calculate a corresponding parameter. In one embodiment, a plant controller may also be assigned to a plurality of energy supply plants, which are for example adjacent, or a plant controller may be assigned to a subsection of a power supply plant, for example, in the case of very large power supply plants.

The plant controller supplements the respective regulator circuits of the inverters. The plant controller influences the respective regulator circuits of the inverters depending on a power differential between the total interchange power of the power supply plant and a specified interchange power. The dependency on the power differential may be explicit, for example, by the plant controller determining a specified parameter from the measured power differential and transmitting it to the regulator circuits of the inverters, or implicit, in that the measured power differential is transmitted by the plant controller to the regulator circuits of the inverters and used there to modify the specified parameters. In this way, the total interchange power may be influenced in a desired form and, for example, may be further changed after a change in the interchange power of the inverters caused by a change in the grid frequency, for example, it may be returned to an initial state before the change in the grid frequency. In one embodiment, the interaction of the regulator circuits of the inverters with the plant controller may bring the total interchange power closer to the specified interchange power by minimizing the power differential at the grid connection and, if necessary, regulating it to zero. Here, the plant controller provides the inverters, with which the plant controller communicatively interacts, for example, the power differential at the grid connection or a parameter derived therefrom for the regulator circuits of the inverters.

The interchange powers of the inverters may comprise an active power and a reactive power, so that the total interchange power of the power supply plant comprises an active power component and a reactive power component. Likewise, the specified interchange power may comprise an active power component and/or a reactive power component.

The active power component and/or the reactive power component of the specified interchange power may be positive or negative, i.e., in the basic state, the power supply plant may draw active electrical power from the energy storages and/or the PV generators and deliver it to the AC voltage grid and vice versa, as well as provide both capacitive and inductive electrical reactive power. The active power component and/or the reactive power component of the specified interchange power may also be specified to the plant controller, for example, by a higher-level grid operation control, by a control power function of the power generation plant or by a demand occurring internally in the power supply plant, e.g., a load or a recharging of a storage.

The active power component and/or the reactive power component of the specified interchange power may, for example, be largely constant over time, for example, equal to zero. In the case of an active power component of the specified interchange power of zero, the power supply plant acts in the sense of a pure flywheel mass to serve the grid by providing an active power instantaneous reserve, whereby the active power component of the total interchange power is then reduced back to zero by the plant controller after a certain time at constant grid frequency. In the case of a non-zero active power component of the specified interchange power, the power supply plan also acts to serve the grid by providing an active power instantaneous reserve, although beyond the provision of the active power instantaneous reserve, an additional continuous exchange of power between individual inverters and the AC voltage grid may be aimed for. Here, the total interchange power—after the provision of the instantaneous reserve—is adjusted to a constant or variable value of the specified interchange power. As a result, for example, the temporally varying electrical power of PV generators may be used on individual inverters in an energetically sensible manner and fed into the AC voltage grid.

The active power component of the specified interchange power may also be frequency-dependent, for example, depending on the grid frequency. Alternatively, or additionally, the reactive power component of the specified interchange power may be dependent on the grid voltage. In such an embodiment, the power supply plant initially acts in a grid-forming manner by providing an instantaneous reserve and additionally also in a grid-supporting manner by providing a primary control power. The method allows a simple realization of the capability of a power supply plant to provide an instantaneous reserve via storage inverters by instantaneously providing active power to damp the grid frequency slope in case of transient power imbalances in the AC voltage grid and/or reactive power to damp the grid voltage slope in case of transient undervoltages or overvoltages. At the same time, the power supply plant may be flexibly configured with regard to its behavior beyond the instantaneous reserve in that, in particular, the active power component of the total interchange power may be adapted to different internal and/or external requirements on the power supply plant during frequency stability.

The intervention dynamic of the plant controller is, in one embodiment, slower than the dynamics of the respective regulators of the inverters. Dynamics is understood to mean the time behavior of a controller or a regulator circuit. In one embodiment, the dynamics may be limited by the clock frequency of the controller or the regulator circuit and may be influenced, for example, by limitations of the slope of a manipulated variable of the controller or the regulator circuit. Specifically, the parameters of the respective regulator circuits of the inverters determine the instantaneous or high-frequency behavior of the inverters with high dynamics, while the parameters of the plant controller influence the behavior of the power supply plant in the temporal mean with lower intervention dynamics.

In one embodiment of the method, the voltage profile deviation used for adjusting the respective interchange power comprises a frequency differential between a grid frequency and a respective reference frequency. Here, the grid frequency is determined from the grid voltage, for example, using a PLL. Depending on this frequency differential, the respective active power of the inverters may then be adjusted by the respective regulator circuits.

In an alternative embodiment, the voltage profile deviation comprises a phase angle differential between a grid phase angle of the grid voltage and a respective inverter phase angle. In this case, the inverter phase angle has a frequency which may be specifiable by the respective regulator circuit as a function of the respective active power, taking into account a respective reference active power and a respective reference frequency.

In one embodiment, the inverters adjust their respective active power using their respective regulator circuits using a respective characteristic curve, for example, a droop characteristic curve. A parameter of the characteristic curve depends on the respective reference frequency. Alternatively, or additionally, a parameter of the characteristic curve depends on a respective reference power. Here, the characteristic curve has a slope.

In one embodiment, the characteristic curve indicates the functional relationship between the respective active power and the respective frequency differential. This corresponds, for example, in a droop regulation to a so-called f(P) static, which is given, for example, in the form of a straight line with a slope df/dP. In one embodiment, the characteristic curve is realized in a respective droop regulation, wherein the respective active power is used as a measured variable in the respective droop regulation and the frequency and/or the phase angle of the output voltage of the respective inverter are set as a manipulated variable. This results in a respective active power of the respective inverter, which may depend on the difference between a grid frequency and the respective reference frequency and/or on the respective reference power of the respective f(P) static.

The method according to the disclosure thus cleverly combines the advantages of the control in the inverter, which is, for example, a voltage-imprinting droop regulation and thus simple, robust, fast and predictable, with a plant controller that enables control of the course of the total interchange power at plant level. Alternatively, or additionally, a reactive power regulation may be carried out in the inverter, which is configured to be particularly simple, robust, fast and predictable, wherein the plant controller also implements a control of the course of the total interchange power at plant level in this case. In one embodiment, parameters of the droop regulations and/or the reactive power regulations of the inverters may be changed by the plant controller in order to achieve a desired profile of the total interchange power.

In one embodiment, the regulation at the plant level is a feed-in regulation, i.e., the plant controller specifies values to the respective regulator circuits of the respective inverters via a communication connection, for example, parameters of the respective droop regulation and/or the respective reactive power regulation. The regulation at plant level is thus easily configurable according to the situation and allows the respective regulators of the inverters to be adjusted individually. In this combination, an inertia of the voltage space vector of the inverters of the respective regulator of a respective inverter, which is necessary for simulating the behavior of a flywheel mass, may then be adjusted, in one embodiment, by suitable matching of the parameters of the droop regulation or the reactive power regulation with the parameters of the plant controller. The latencies of the superimposed control by the plant controller, for example, the communication latencies between the plant controller and the inverters, do not affect the fast respective controls of the respective inverters. In one embodiment, this is advantageous for decentralized autonomous inverter-individual droop regulations and respectively reactive power regulations. In one embodiment, the method may occur without delay elements in the fast control loops of the inverter regulation. A possible tendency to oscillate and possible instabilities can thereby be avoided.

In one embodiment, the plant controller adjusts the respective active power of the inverters by influencing parameters of the respective characteristic curves of the regulator circuits of the inverters. In one embodiment, the plant controller influences the parameter that depends on the reference frequency and/or respectively the parameter that depends on the reference power. In the case of a droop regulation, this corresponds to a shift in the static, whereby the respective phase angle differential between grid phase angle and inverter phase angle is influenced in such a way that a change in the respective active power in the desired direction is established. In one embodiment, the influence is advantageously effected in such a way that the active power component of the total interchange power of the power supply plant is approximated to the active power component of the specified interchange power with a specifiable time constant.

In one embodiment, the influence may be such that the respective reference frequency is matched to a grid frequency measured and low-pass-filtered at the grid connection. This enables dynamic tracking of the reference frequency by low-pass filtering of the grid frequency such that the reference frequency may correspond to an average value of the grid frequency measured at the grid connection point. As a result, the inverter phase angle is ultimately synchronized with the grid phase angle by the plant controller (with a time delay). This embodiment is advantageous since an adjustable time delay is provided for the plant controller by the low-pass filtering. In this respect, the plant controller may react with a delay compared to the regulators of the inverters and, in particular, regulate a defined decay of the instantaneous reserve and the power exchange of the power supply plant after the provision of the instantaneous reserve with regard to active power and/or reactive power.

The transmission from the plant controller to the inverters is communicative, e.g., by a wired or wireless transmission. The parameter(s) to be adjusted in the regulator circuits of the inverters may be transmitted from the plant controller to the regulator circuits of the inverters, for example, via broadcast. Here, the respective parameters transmitted to the inverters may be the same in each case, i.e., in particular a common reference frequency and/or a common reference power may be transmitted to the inverters. The parameters of the respective regulator circuits of the inverters may also be adjusted individually differently for different inverters.

The method is based in one embodiment on a combination of regulator circuits in the inverters, for example, droop regulations with a droop characteristic curve and/or a reactive power regulation with a Q(U) characteristic curve, and a superimposed change of parameters of the regulator circuit. The changed parameters depend on the power differential at the grid connection, which is determined by the plant controller and used to calculate the changed parameter or transmitted to the inverters for the corresponding autonomous calculation of changed parameters. In one embodiment, the reference frequency and/or the reference power of the droop characteristic curve may be modified, either autonomously in the inverters as a function of the power differential at the grid connection or by the plant controller specifying the reference frequency and/or the reference power dynamically by broadcast or by individual communication to the inverters. This causes a change in the active power caused by a frequency change in the grid frequency to be curtailed after a certain time. Overall, the power generation plant is able to provide an instantaneous reserve whose characteristic is analogous to an electromechanical flywheel mass. The time sequence of the instantaneous reserve power is influenced by the dynamics of the regulators of the inverters and the intervention dynamics of the plant controller, wherein the dynamics of the regulators of the inverters are being faster than the intervention dynamics of the plant controller.

In one embodiment, the dynamics of the regulators of the respective inverters may be adjusted. This may be done, for example, by specifying parameters of the respective regulator circuits, for example, by specifying a respective slope of the respective characteristic curves of the respective regulator circuits. The intervention dynamics of the superimposed parameter adjustment may also be designed to be optionally adjustable. The adjustment may be made, for example, by specifying a gain factor of an integrator circuit of the power differential at the grid connection and/or a filter constant of the low-pass filtering of the grid frequency measured at the grid connection. This allows the time behavior of the grid-supporting behavior of the power supply plant, for example, the time behavior of the provision of the instantaneous reserve, to be further refined, such that "fast" changes of the grid frequency and/or the grid voltage in the inverters lead to power changes, which are reduced by the "slower" tracking of parameters of the respective regulator.

In one embodiment, the level of an active power instantaneous reserve provided by the power supply plant at a given voltage profile deviation may be adjusted in terms of its maximum power and energy by specifying parameters of the regulators of the inverters and/or by specifying parameters of the plant controller. In addition, the dynamics of the respective regulators of the inverters may be adjusted, for example, by specifying the respective slope of the characteristic curve. In one embodiment, the dynamics of the respective regulator circuits may be adjusted, for example, by specifying a slope of the characteristic curve. Additionally, or alternatively, the intervention dynamics of the plant controller may be adjusted, for example, by specifying parameters of an I-controller or a PI controller of the superimposed parameter adjustment.

In one embodiment, the disclosure makes it possible to use the droop regulation, which has been proven, for example, in microgrids, in a power supply plant connected to an AC voltage grid with grid-synchronous inverters, and at the same time enables a current-impressing feed-in to the higher-level AC voltage grid.

In one embodiment, a power exchange with respective energy storages connectable to the respective inverters may be controlled in such a way that a respective specifiable state of charge of the energy storages is aimed for, which may correspond to 50% of the capacity of the respective energy storage. In one embodiment, charging or discharging of the energy storage devices is carried out with a lower average power than the maximum interchange power due to the respective control of the interchange power of the inverters depending on the respective deviation, for example, on the respective phase angle differential.

In one embodiment, immediately after the instantaneous reserve is provided one or more times, the corresponding energy storages of the power generating plant or PV generators of the PV plant are adjusted to the initial starting state. In the case of PV generators, this is done by driving them to a corresponding operating point on the PV characteristic curve, which is equal to or below the maximum power point (MPP). In the case of energy storages, the energy storage state is driven to the initial state. This is done by enabling them to exchange energy with the grid or a PV plant, even without being stimulated by a grid event and resulting in an exchange of power due to droop regulation, for example. In the case of an AC-coupled energy exchange with the grid, this restoration of the initial state is carried out with a significantly smaller power and thus a slow time constant than the provision of the active power instantaneous reserve. Thus, the storage capacity is optimally used in order to, on the one hand, effectively support the AC voltage grid with a high active power on short notice and in order to, on the other hand, load the AC voltage grid only slightly during the slow return to the initial state.

The plant controller and the settings made by the communication with the inverters thus improve the ability of power supply plants to provide an instantaneous reserve. In addition to the individual parameterization of individual inverters, it is also possible to individually parameterize energy storage systems on the inverters. This makes it possible, for example, to flexibly define, which inverter and/or which storage unit in the plant is to make which contribution to the instantaneous reserve. This enables load sharing, which is advantageous, for example, when energy storages have different storage states, e. g., are full or empty, and/or are have different capabilities with respect to their respective maximum active or reactive power.

Another advantage is that the transient current and/or the transient power during the exchange of the instantaneous reserve may be limited to maximum permissible values by the respective regulator circuit of the respective inverters within the scope of self-protection. This may be done by the fast dynamics of the regulator circuits of the inverters by the inverters themselves. In this case, the inverters may remain in a voltage-impressing, grid-forming state, if required. This may be carried out using a current limitation method of the virtual impedance.

In one embodiment of the method, the respective inverters may exchange reactive power with the AC voltage grid, wherein the respective regulation of the respective inverters is configured to influence the interchange power when an apparent power limit of the respective inverter is reached such that the reactive power exchanged with the AC voltage grid may be reduced and the active power exchanged with the AC voltage grid may be increased. As a result, overloading of the inverter may be avoided.

This is advantageous since, if stationary reactive power was output before a change in the grid frequency, it may be changed during the provision of the instantaneous reserve and, for example, may be reduced in favor of the active power exchange during the provision of the instantaneous reserve. As a result, the inverters may be protected against overload, for example, by remaining within the scope of the local voltage limits. In a further embodiment of the method, in addition to the active power contribution and/or active current contribution, a grid-voltage-supporting reactive power contribution and/or reactive current contribution is also possible and adjustable. In one embodiment, the adjustment is carried out via parameterization of the regulations of the inverters, e.g., by the plant controller or as a function of measurement data of the plant controller. In one embodiment, the method also provides an instantaneous reserve of reactive power for voltage support in the event of a short circuit.

In a further embodiment of the method, the reactive power component of the total interchange power at the grid connection may be adjusted by the plant controller as a function of a measured voltage at the grid connection. Additionally, or alternatively, the respective reactive power of the inverters may be adjusted by the plant controller and a reactive power regulation in the respective inverter. In this case, adjusting the reactive power component of the total interchange power at the grid connection comprises determining a reactive power component of the specified interchange power at the grid connection, for example, as a function of the grid voltage, measuring the reactive power component at the grid connection, determining respective reactive power set points for the inverters, for example, as a function of the reactive power component of the specified interchange power and the measured reactive power component at the grid connection, and transmitting the respective reactive power set points to the inverters by the plant controller. In addition, the adjustment of the reactive power component of the total interchange power at the grid connection comprises measuring the respective grid voltage at the respective output of the inverters, comparing the respective measured grid voltage with a reference voltage corresponding to an average value of the grid voltage, determining a respective reactive power correction value as a function of the deviation of the measured grid voltage from the reference voltage by means of a Q-U characteristic curve, and adjusting the respective reactive power based on the sum of the respective reactive power set point and the respective reactive power correction value by the inverters.

A power supply plant according to the disclosure has a grid connection for connection to an AC voltage grid and a plurality of inverters and a plant controller. The plant controller is communicatively connected to the inverters. The inverters are configured to exchange respective electrical interchange powers with the AC voltage grid. The power supply plant is configured to exchange an electrical total interchange power with the AC voltage grid via the grid connection, wherein the total interchange power is composed of the respective electrical interchange powers. The inverters are configured to adjust their respective interchange powers using a respective regulator circuit as a function of a respective frequency differential between a grid frequency and a respective reference frequency. The plant controller is configured to influence the respective regulator circuits of the individual inverters as a function of a power differential between the total interchange power and a specifiable reference interchange power.

In a method according to the disclosure for operating an inverter in a power supply plant having a grid connection that is connected to an AC voltage grid, the inverter exchanges electrical interchange power comprising active power and reactive power with the AC voltage grid via the grid connection. The inverter adjusts its interchange power using a regulator circuit as a function of a voltage profile deviation of a voltage profile of a grid voltage from a reference profile based on a reference frequency and/or as a function of a voltage amplitude differential between a grid voltage and a reference voltage. In this case, a specified parameter of the regulator circuit is varied as a function of a power differential between the interchange power of the power generation plant at the grid connection and a specified interchange power.

In the method, the intervention dynamics of the variation of the specified parameter of the regulator circuit is slower than the regulation dynamics of the interchange power of the inverter, so that the regulator reacts faster with changes of the interchange power to deviations of the grid voltages than with changes of the specification parameter to changes of the power differential at the grid connection point.

In one embodiment, the regulator circuit of the inverter may comprise a droop controller, wherein the droop controller uses the active power of the inverter as a measured variable and uses a characteristic curve with a slope to adjust the frequency and/or the phase angle of the output voltage of the inverter as a manipulated variable. In this case, a specified parameter of the characteristic depends on the reference frequency and/or on a reference power, the reference frequency and/or the reference power being varied as a function of the power differential, for example, as a function of an integral of the power differential. As a result, the active power at the grid connection may be approximated to the active power component of the specified interchange power with a specifiable time constant.

In one embodiment of the method, the reference frequency is matched to a low-pass-filtered grid frequency measured at the grid connection. As a result, any frequency deviation that leads to a change in the active power of the inverter via droop statics is minimized with the time constant of the low-pass filter used, and the change in active power is cancelled out accordingly.

In an alternative embodiment of the method, the power differential is measured at the grid connection outside the inverter, for example, in a plant controller, and converted into a reference power using an integrator circuit. The reference power is then transmitted to the inverter and used as a modified parameter for regulating the output power.

In an alternative embodiment, the power differential is measured outside the inverter, for example, in a plant controller, and transmitted to the inverter, wherein the inverter determines the reference power from the power differential using an integrator circuit and uses it as a modified parameter to regulate the output power.

The integrator circuit configured to calculate the specified parameter, for example, the reference power, may have an amplifier with an amplification factor. The gain factor of the integrator circuit and the slope of the droop statics may be adjustable. As a result, the inverter phase angle has an inertia with respect to the grid voltage phase angle, which is adjustable by the product of amplification factor and the slope. Additionally, or alternatively, the synchronization of the inverter phase angle with the grid voltage phase angle has a damping which may be adjusted by the ratio of the gain factor to the slope.

The inertia and/or the damping of the inverter phase angle may be adjustable during the ongoing operation of the power supply plant, whereby for the adjustment of inertia and/or damping the gain factor and/or the slope may be adjusted via a low-pass filter with adjustable time constant or via a ramp with adjustable slope.

In one embodiment of the method, the regulator circuit of the inverter may comprise a grid-following reactive power regulation which executes the following acts:

measuring the grid voltage, determining a reactive power correction value as a function of the deviation of the measured grid voltage from a reference voltage by means of a Q-U characteristic curve, adjusting the reactive power based on the sum of the reactive power component at the specified interchange power and the respective reactive power correction value.

Here, the reference voltage as the specified parameter of the Q-U characteristic curve is varied in such a way that the reactive power of the inverter is approximated to the reactive power component of the specified interchange power with a specifiable time constant, in that the reactive power correction value approaches zero.

BRIEF DESCRIPTION OF THE DRAWINGS

The disclosure is further explained and described below with reference to exemplary embodiments illustrated in the figures.

DETAILED DESCRIPTION

Figure 1:
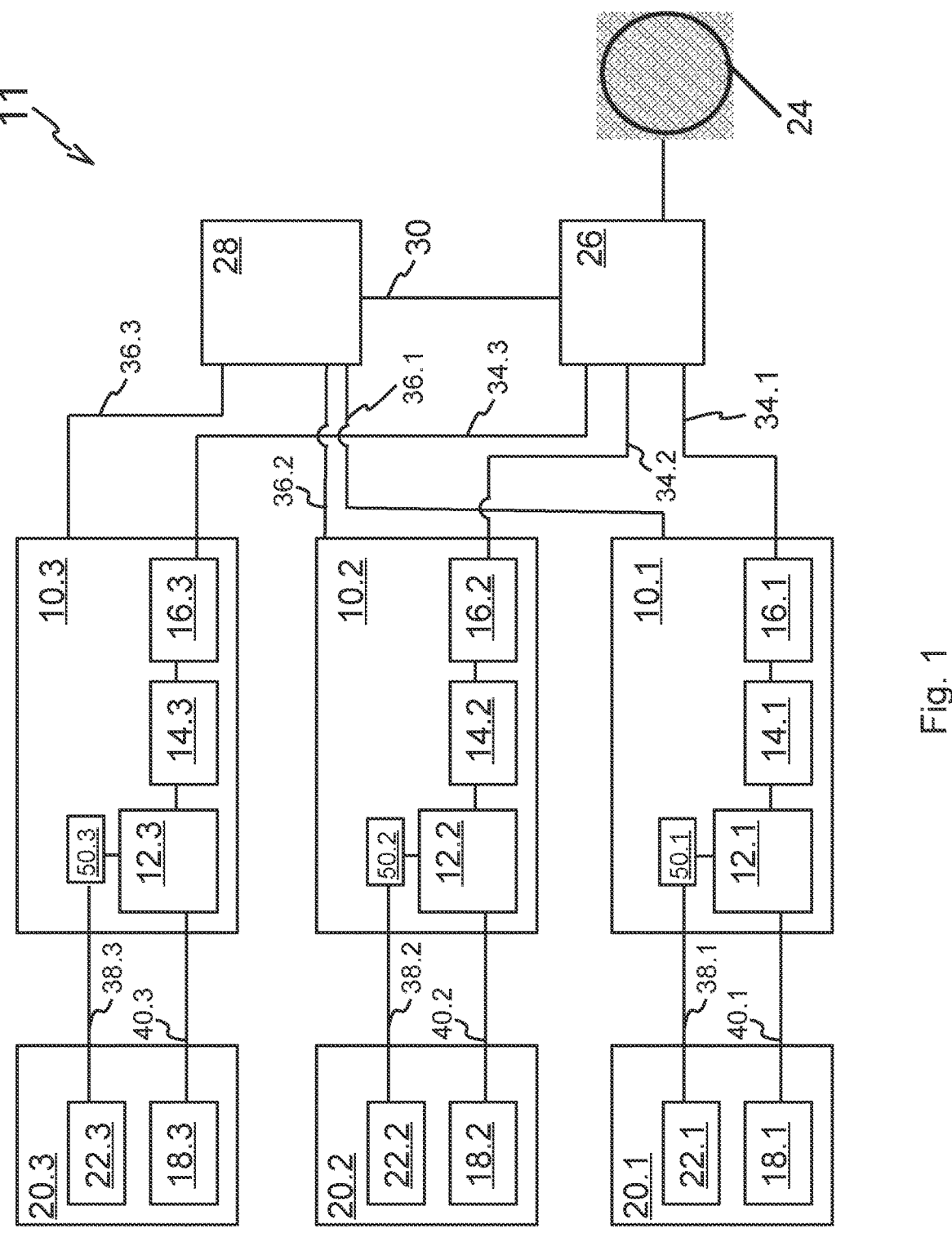
FIG. 1 shows a power supply plant having three inverters with energy storage systems.

FIG. 1 shows a power supply plant 11 having three inverters 10.1, 10.2, 10.3, each of which is equipped with a voltage impressing and insofar grid-forming droop regulator 50.1, 50.2, 50.3. The number of three inverters 10.1, 10.2, 10.3 is an example, and a power supply plant 11 with only one or two or more than three inverters 10.1, 10.2, 10.3 is also conceivable. An energy storage device 18.1, 18.2, 18.3, e.g., a battery, is connected to each inverter 10.1, 10.2, 10.3 via a DC voltage line 40.1, 40.2, 40.3 respectively. The inverters 10.1, 10.2, 10.3 each have a bridge circuit 12.1, 12.2, 12.3 composed of power switches. The bridge circuit 12.1, 12.2, 12.3 is configured to convert direct current from the DC voltage line 40.1, 40.2, 40.3 into alternating current on the AC voltage line 34.1, 34.2, 34.3 and/or vice versa. For this purpose, the respective bridge circuit 12.1, 12.2, 12.3 is actuated by the respective droop regulator 50.1, 50.2, 50.3 with suitable switching signals. Furthermore, the respective droop regulator 50.1, 50.2, 50.3 may be connected to a respective energy storage management 22.1, 22.2, 22.3 of the energy storage 18.1, 18.2, 18.3 via a respective data line 38.1, 38.2, 38.3. Energy storages 18.1, 18.2, 18.3 and energy storage management 22.1, 22.2, 22.3 each together form an energy storage system 20.1, 20.2, 20.3.

The inverters 10.1, 10.2, 10.3 are connected to a common grid connection 26 via respective AC voltage lines 34.1, 34.2, 34.2. In the power path between the respective bridge circuit 12.1, 12.2, 12.3 and the respective connection of the respective AC voltage line 34.1, 34.2, 34.3, a measuring device 14.1, 14.2, 14.3 and a coupling impedance 16.1, 16.2, 16.3 are arranged, respectively. The respective measuring device 14.1, 14.2, 14.3 is configured to measure the grid voltage of the AC voltage grid 24 as well as the AC current flowing between the respective bridge circuit 12.1, 12.2, 12.3 and the AC voltage grid 24 and to determine grid frequency, phase angle and, if necessary, the respective interchange power therefrom. The respective coupling impedance is configured to decouple the inverters from one another in the mode of operation as voltage sources.

The respective inverter 10.1, 10.2, 10.3 is connected to the plant controller 28 of the power supply plant 11 via a respective data line 36.1, 36.2, 36.3. A communication of the plant controller 28 with the respective inverters 10.1, 10.2, 10.3 may be carried out via the respective data line 36.1, 36.2, 36.3.

The inverters 10.1, 10.2, 10.3 are operated in a voltage-imprinting manner on the AC voltage grid 24 and each adjust a voltage U with a defined frequency f and phase angle θ at the connections of the AC voltage lines 34.1, 34.2, 34.3, wherein in particular the respective frequency f is adjusted as a function of active power flows $P_{WR}$ and reactive power flows and/or active and reactive current flows. For this purpose, the inverters 10.1, 10.2, 10.3 may, for example, comprise a regulator 50.1 according to FIG. 2 and/or a reactive power regulator according to FIG. 7. Alternatively, or additionally, the inverters 10.1, 10.2, 10.3 may be operated in a current-influencing manner, whereby, for example, their active power may be adjusted as a function of the grid frequency and/or their reactive power as a function of the grid voltage.

The power supply plant 11 further comprises a measuring device at or in the grid connection 26, which captures the active power $P_{WR}$ and/or the reactive power Q at the grid connection 26 of the power supply plant 11 and relays the measured values to a plant controller 28 via a data line 30. The plant controller 28 processes the measurement information from the measuring device at the grid connection 26 in a control algorithm and generates at least one reference value, which is transmitted to the inverters 10.1, 10.2, 10.3 via the respective data line 36.1, 36.2, 36.3. For example, this reference value may comprise a power differential at the grid connection between the current interchange power at the grid connection and a specified interchange power, from which a reference active power $P_{ref}$ or a reference frequency $f_{ref}$ may be formed for the droop regulator 50.1, 50.2, 50.3 of the voltage impressing inverters 10.1, 10.2, 10.3. Alternatively, or additionally, the reference value may comprise a reference reactive power for a reactive power regulator 80 of any voltage-impressing inverters of the power supply plant 11.

It is advantageous in one embodiment to select a plant controller 28 and a measuring device in the grid connection 26 with sufficiently rapid dynamics in order to be able to respond quickly to grid events by means of the plant controller 28. The response time of the plant controller 28 is, for example, influenced by its internal clock rate, its computing capacity and/or the data rate of the communication via the respective data line 36.1, 36.2, 36.3 with the respective inverter 10.1, 10.2, 10.3. In one embodiment, the plant controller 28 is configured such that time constants below 10 seconds, for example, below 1 second, may be realized.

Figure 2:
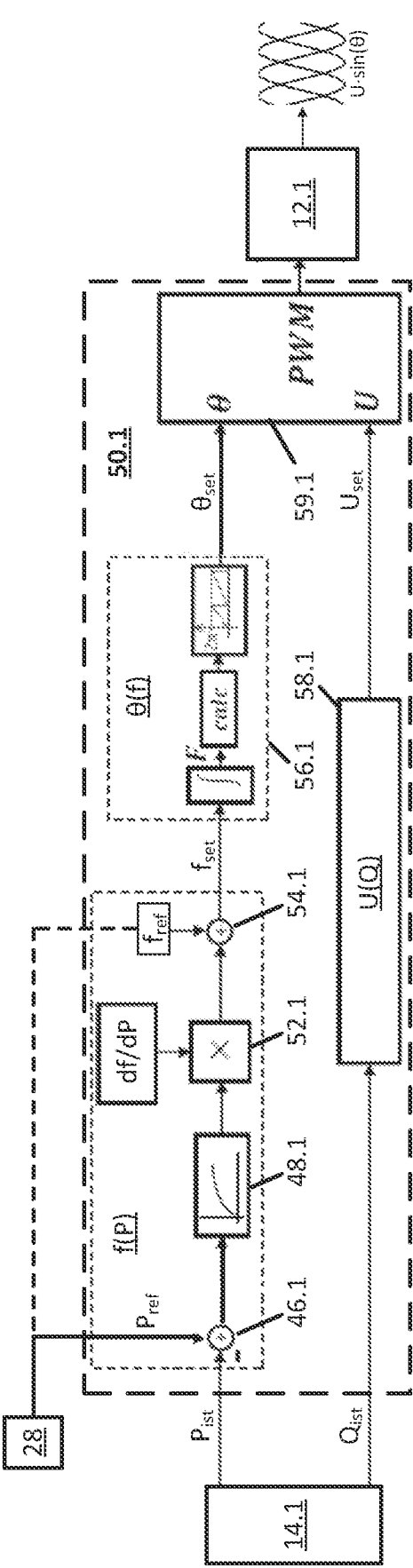
FIG. 2 shows, by way of example, a schematic representation of a regulation of an inverter.

FIG. 2 shows an example of the regulator circuit 50.1 of the inverter 10.1 in schematic form. In one embodiment, the regulators 50.2 and 50.3 of the inverters 10.2 and 10.3 have a similar structure.

The measured active power $P_{is}$ is received from the measuring circuit or device 14.1 of the inverter 10.1 and subtracted from the reference power $P_{ref}$ in the comparator 46.1. The result is filtered in an optional filter circuit 48.1. In the droop circuit or element 52.1, a frequency is generated from this by multiplication with a droop factor df/d, which is linked in the comparator circuit 54.1 with a reference frequency $f_{ref}$ to form a set frequency $f_{set}$. The resulting set frequency $f_{set}$ is converted into a phase angle $θ_{set}$ in a synchronization circuit 56.1.

The measured reactive power $Q_{is}$ is received from the measuring device 14.1 of the inverter 10.1 and a set voltage $U_{set}$ is generated in a reactive power regulator circuit 58.1 by means of a U(Q) droop characteristic curve. In a pulse width modulation circuit 59.1, phase angle $θ_{set}$ and set voltage $U_{set}$ are linked and converted into a pulse width modulated control signal PWM that is used to drive the bridge circuit

12.1 to apply a single or three phase output voltage to the AC voltage line 34.1 and exchange a resulting AC current with AC voltage grid 24.

It is thus made possible, for example, in the event of a sudden change in the grid frequency due to, e.g., a suddenly occurring power imbalance, to exchange a control power which is specified by the droop regulator circuits 50.1, 50.2, 50.3 of the inverters 10.1, 10.2, 10.3 at the time when the sudden frequency change occurs. Specifically, a deviation of the phase angle $\theta_{set}$ from the phase angle of the grid voltage leads to a change in the measured active power $P_{is}$, which in turn leads to a change in the set frequency via the droop element 52.1, so that the phase angle $\theta_{set}$ tracks the phase angle of the grid voltage. However, even in a case were the set frequency $f_{set}$ is returned to the grid frequency, a phase angle differential remains, so that the resulting control power is dependent on the frequency differential between the grid frequency and the reference frequency. The total interchange power of the power generation plant 11 would comprise this control power permanently without further measures as long as there is a frequency differential between grid frequency and reference frequency.

In the following, however, the total interchange power of the power generation plant 11 may be adjusted to a different value, e.g., to a power output with the values of the active and reactive power before the provision of the control power, by the plant controller 28 intervening in the droop regulators 50.1, 50.2, 50.3 of the inverters 10.1, 10.2, 10.3 within a predetermined period of time and, for example, modifying the reference active power $P_{ref}$ and/or the reference frequency $f_{ref}$ in the droop regulator circuits 50.1, 50.2, 50.3.

For this purpose, power measurement signals from the grid connection 26 of the power generation plant 11 may be evaluated and the characteristic curve reference values $P_{ref}$ or $f_{ref}$ may be modified, wherein the characteristic curve reference values $P_{ref}$ or $f_{ref}$ are generated, for example, by means of an integral controller as a function of set point and actual values of the interchange power at the grid connection 26. On the basis of the dynamic characteristic curve reference values $P_{ref}$ or $f_{ref}$ specified in this way, the droop characteristics curves 60 of the inverters 10.1, 10.2, 10.3 are shifted in their origin (cf. FIG. 3) in such a way that the interchange power is adjusted in a configurable time to the active power output before the provision of the instantaneous reserve or to set point values which have changed in the meantime for this. With suitable design, the average and maximum energy flows for grid support per frequency deviation event may be minimized.

Figure 2A:
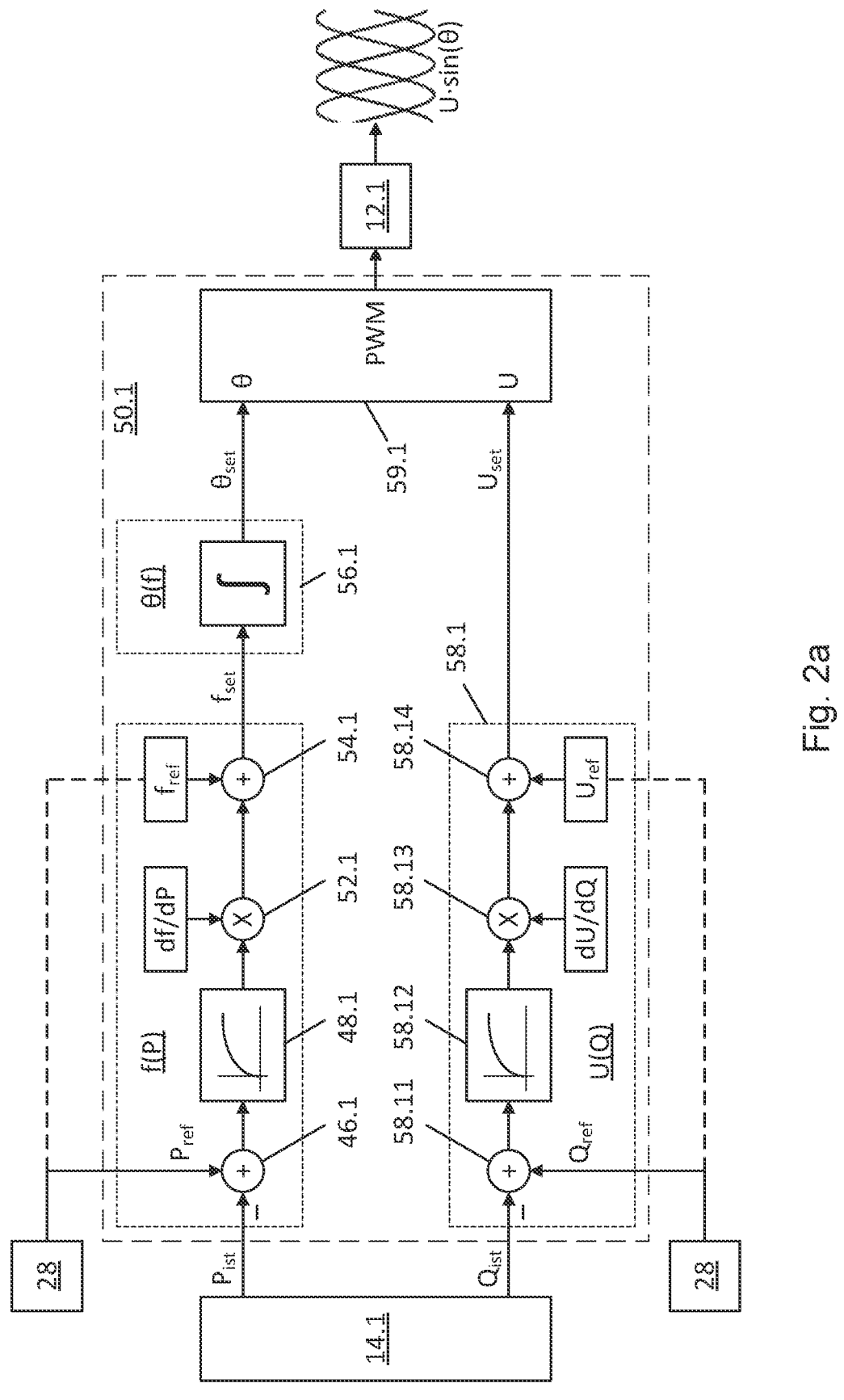
FIGS. 2a-2d show schematic representations of embodiments of the regulation of an inverter in a power generating plant.

FIG. 2a shows an embodiment of the regulator circuit 50.1 of an inverter 10.1 of the power supply plant 11, in which the reactive power regulator circuit 58.1 is implemented in more detail. The measured reactive power $Q_{is}$ is subtracted from a reference reactive power $Q_{ref}$ by means of a comparator circuit 58.11 in the reactive power regulator circuit 58.1. The result is filtered in an optional filter circuit or element 58.12. In the droop element 58.13, a voltage value is generated from this by multiplication with a droop factor dU/dQ, which is linked in the comparator circuit 58.14 with a reference voltage $U_{ref}$ to form an inverter voltage amplitude $U_{set}$. In pulse width modulation circuit 59.1, the phase angle $\theta_{set}$ resulting from the f(P) droop regulation and the inverter voltage amplitude $U_{set}$ are combined and converted into a pulse width modulated control signal PWM that is used for actuating the bridge circuit 12.1.

In the embodiment according to FIG. 2a, in addition to the characteristic curve reference values $P_{ref}$ and $f_{ref}$, respectively, which are used for influencing the f(P) droop regulation, further characteristic curve reference values $Q_{ref}$ and $U_{ref}$, respectively, are modified in the droop regulator circuits 50.1, 50.2, 50.3 of the inverters 10.1, 10.2, 10.3, for example, by the plant controller 28 providing corresponding characteristic curve reference values. As a result, the droop characteristic curves of the U(Q) droop regulations are influenced and, analogously to droop characteristic curves 60 of the f(P) characteristic curves (cf. FIG. 3), may be shifted at their origin in such a way that the U(Q) droop regulation is influenced in such a way that the reactive power component of the interchange power of the inverters 10.1, 10.2, 10.3 is adjusted after a change in the reactive power output, for example, due to a change in voltage of the grid voltage, in a configurable time to the reactive power output before the change in voltage or to a changed set point value for the reactive power at the grid connection 26 which has changed in the meantime.

Figure 2B:
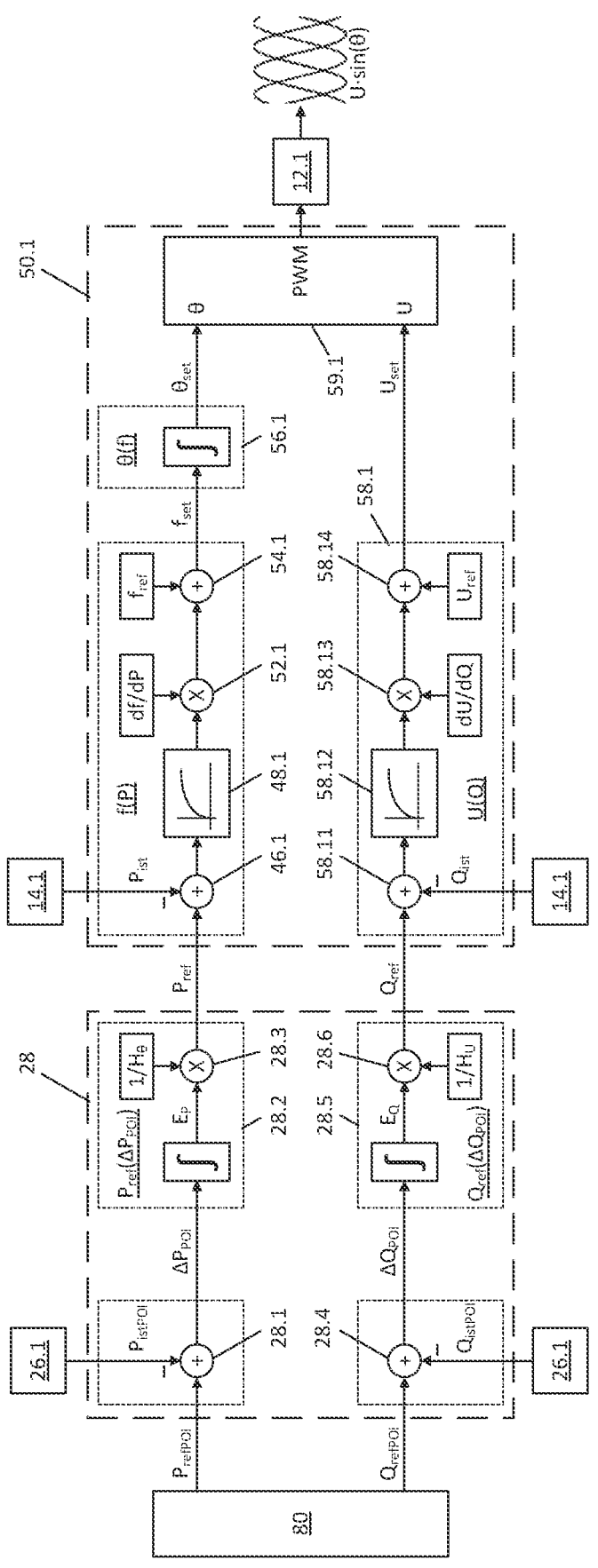

FIG. 2b shows a further embodiment of the regulation of the power supply plant 11. The plant controller 28 with its components is shown in more detail therein. The representation of the regulator circuit 50.1 corresponds to the illustration according to FIG. 2a, wherein, of course, several regulator circuits 50.1, 50.2, 50.3 of several inverters 10.1, 10.2, 10.3 may be connected to the same plant controller 28. The plant controller 28 uses grid connection set points $P_{refPOI}$ and $Q_{refPOI}$ that represent the desired output power of the power supply plant 11, where, for example, the reactive power set point $Q_{refPOI}$ is optional and, for example, may have the value zero. The grid connection set points $P_{refPOI}$ and $Q_{refPOI}$ may be specified by a higher-level operational control circuit 80, for example, a grid control station, or may be stored in the plant controller 28 itself. In this case, the grid connection set points $P_{refPOI}$ and $Q_{refPOI}$ may be specified in a fixed manner once and, for example, have the value zero or may be changed dynamically by the operation management 80 and/or by the plant controller 28 itself as required.

The plant controller 28 has comparator circuits 28.1, 28.4 that determine the control deviations $\Delta P_{POI}$ and $\Delta Q_{POI}$ between the grid connection set points $P_{refPOI}$ and $Q_{refPOI}$ and the respective measured output powers $P_{isPOI}$ and $Q_{isPOI}$. The control deviations $\Delta P_{POI}$ and $\Delta Q_{POI}$ are integrated into integrator circuits 28.2 and 28.5, respectively, and multiplied by gain factors $1/H_\theta$ and $1/H_U$ in amplifier circuits 28.3, 28.6, respectively. The resulting integrated and normalized control deviations of the output powers $P_{isPOI}$ or $Q_{isPOI}$ with respect to their respective grid connection set points $P_{refPOI}$ and $Q_{refPOI}$ are transmitted as characteristic curve reference values $P_{ref}$ or $U_{ref}$ to the regulator circuit 50.1 of the inverter 10.1 and, if necessary, to the regulator circuits 50.2, 50.3 of the further inverters 10.2, 10.3, which are not shown, and are further used there according to the embodiment according to FIGS. 2 and 2a in order to calculate the actuation of the respective bridge circuit 12.1.

Figure 2C:
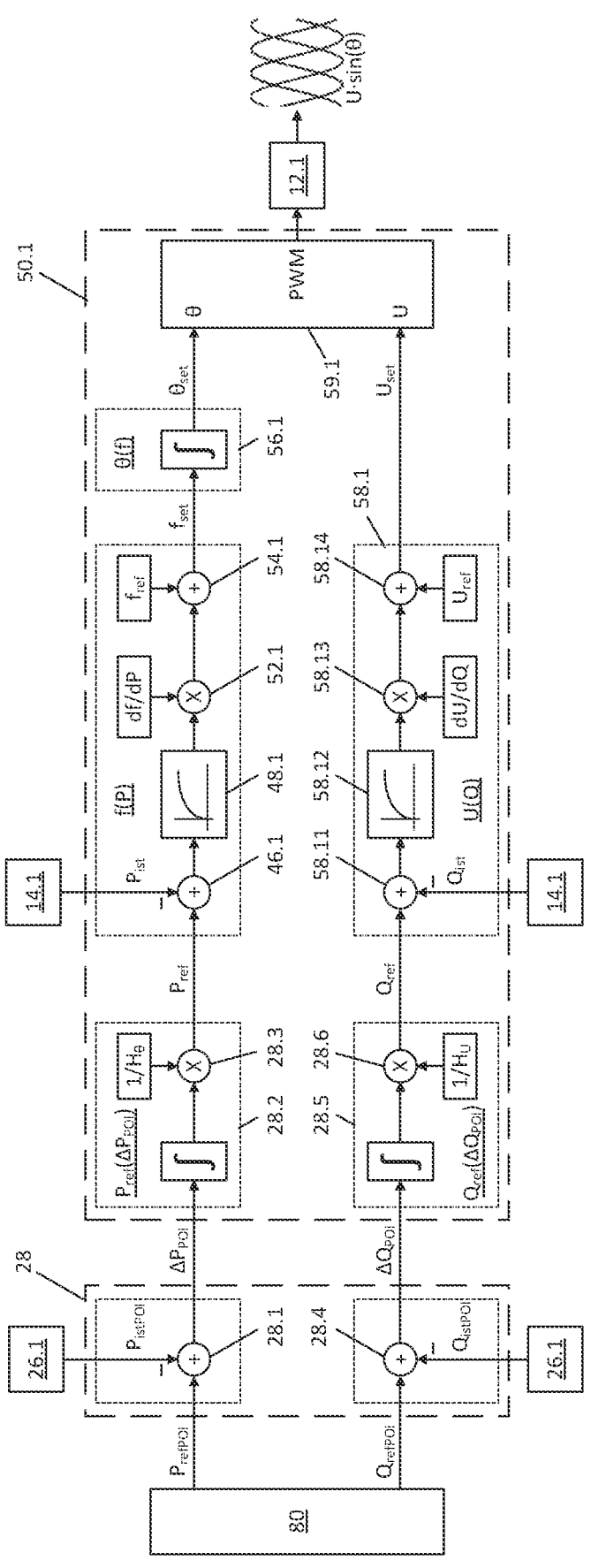

FIG. 2c shows a further embodiment of the regulation of the power supply plant 11, which has essentially the same components as the regulation according to FIG. 2b, whereby the plant controller 28, in deviation from FIG. 2b, only determines the control deviations $\Delta P_{POI}$ and $\Delta Q_{POI}$ and transmits them to the regulator circuit 50.1 and, if necessary, further regulators circuits 50.2, 50.3. This has the advantage that the calculation of the characteristic curve reference values $P_{ref}$ or $Q_{ref}$ may be implemented in the regulator circuits 50.1, 50.2, 50.3 of the inverters 10.1, 10.2, 10.3, where they may be adjusted optimally to the respective conditions. In addition, the plant controller 28 itself as well as the communication with the inverters 10.1, 10.2, 10.3 may be simplified, for example, in that the plant controller 28 only determines the control deviations $\Delta P_{POI}$ and $\Delta Q_{POI}$ and does not have to perform any further calculations or control tasks and in this respect no feedback effect of any special characteristics of the inverters 10.1, 10.2, 10.3 may occur on the plant controller 28.

Figure 2D:
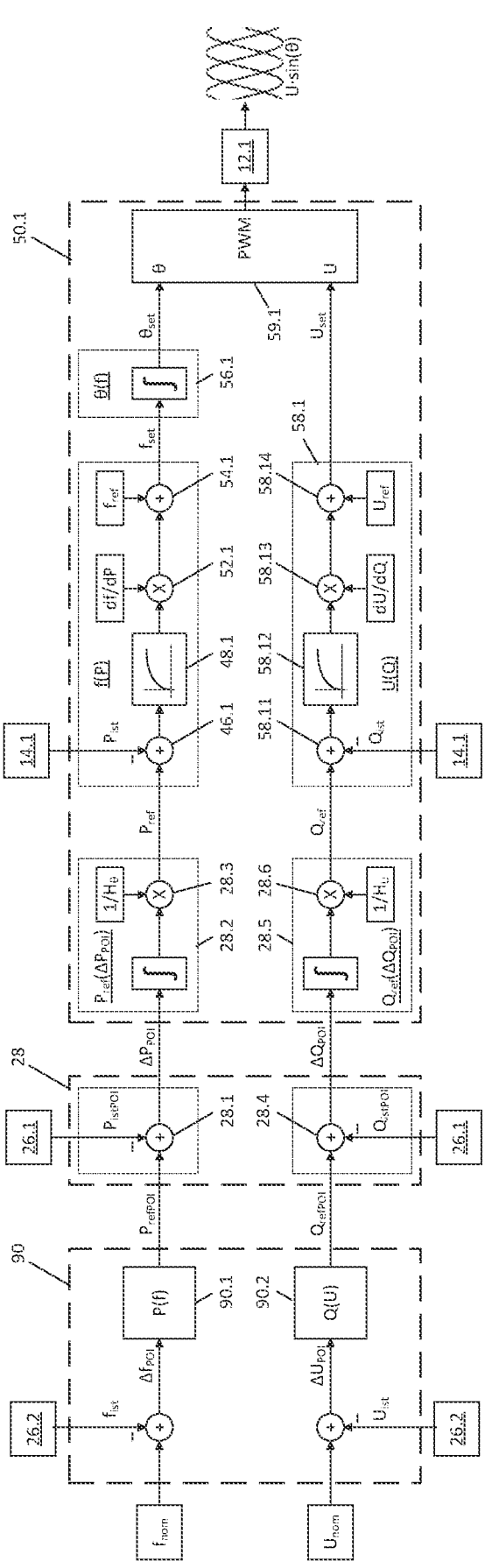

FIG. 2d shows a further embodiment of the regulation of the power supply plant 11, which has essentially the same components as the regulations according to FIGS. 2b and 2c, whereby in addition the grid connection set points $P_{refPOI}$, $Q_{refPOI}$ are determined dynamically by means of a primary control circuit 90 and transmitted to the plant controller 28. The primary control circuit 90 may be configured in a separate circuit unit or be integrated in the plant controller 28. Within the scope of the primary control circuit 90, measured values of the current grid frequency $f_{is}$ and the current grid voltage amplitude $U_{is}$ of corresponding measuring devices 26.2 at the grid connection 24 are subtracted from nominal values $f_{nom}$, $U_{nom}$, wherein the nominal values $f_{nom}$, $U_{nom}$ may be fixed, for example, as nominal values of the AC voltage grid 24 and/or are transmitted by an operation control circuit 80. The resulting control deviations $\Delta f_{POI}$ and $\Delta U_{POI}$ are converted in a P(f) controller 90.1 or in a Q(U) controller 90.2 into grid connection set values $P_{refPOI}$ and $Q_{refPOI}$, respectively, which are transmitted to the plant controller 28 and further used there according to the embodiment according to FIGS. 2b and 2c, in order to calculate the characteristic curve reference values $P_{ref}$, $U_{ref}$ and the control deviations $\Delta P_{POI}$, $\Delta Q_{POI}$, respectively, and to feed them to the regulator circuit 50.1.

In the embodiments according to FIGS. 2a to 2d, active power and reactive power are independently linked to frequency and voltage, respectively. It is therefore understood that the active power-frequency regulation and/or the reactive power voltage regulation may each be implemented individually, wherein the regulation of the reactive power component is optional and may be omitted if necessary.

Figure 3:
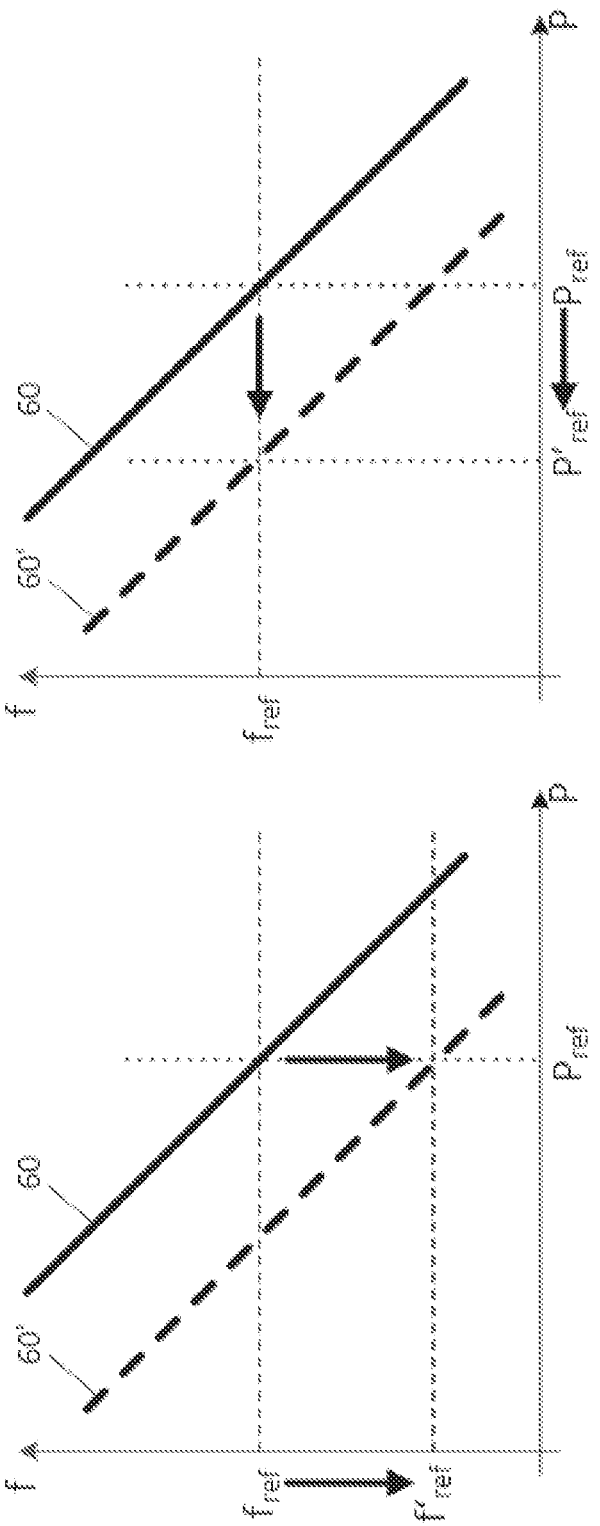
FIG. 3 shows, by way of example, characteristic curves of a regulation of an inverter.

FIG. 3 shows an example of two variants of a shift of the characteristic curve 60 with the slope df/dP to a characteristic curve 60' with the same slope df/dP. Such a shift may, for example, be caused by a change in the reference frequency $f_{ref}$ to $f'_{ref}$ (left graph of FIG. 3). In this case, the characteristic curve 60 is shifted downwards. Such a shift may alternatively or additionally be carried out, for example, by changing the reference power $P_{ref}$ to $P'_{ref}$ (right graph of FIG. 3). In this case, the characteristic curve 60 is shifted to the left. In both cases, the same shifted characteristic curve 60' results.

Figure 4:
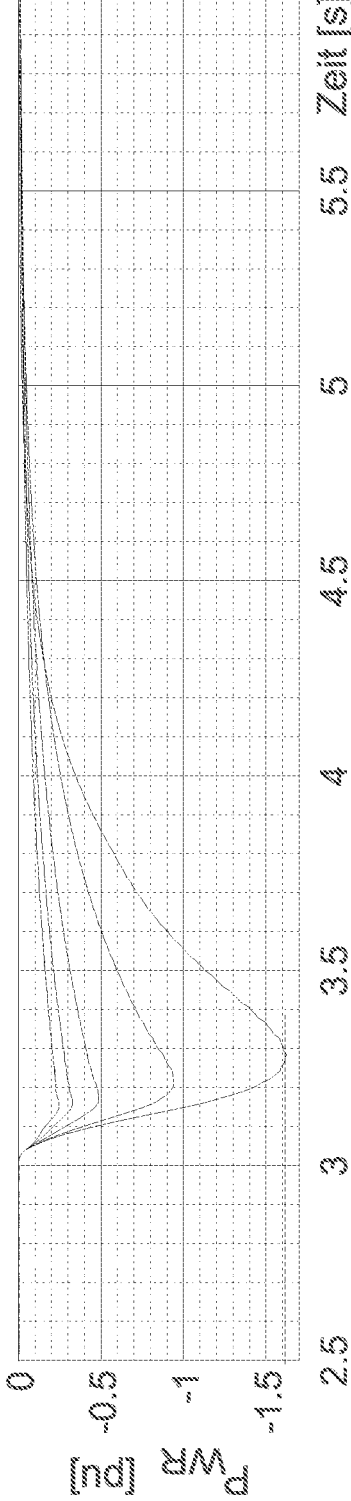
FIG. 4 shows, by way of example, various time profiles of the interchange power of an inverter.

FIG. 4 shows an example of the interchange power of an inverter 10.1, 10.2, 10.3 after the occurrence of a frequency differential in the provision of an active power instantaneous reserve by combining the droop regulator circuits 50.1, 50.2, 50.3 of the inverters 10.1, 10.2, 10.3 and the superimposed and defined delayed change of the characteristic curve reference values $P_{ref}$ or $f_{ref}$ or the characteristic curves 60 into the characteristic curves 60. The different time profiles of the interchange power correspond to different slopes df/dP of the characteristic curve 60. It can be seen that the response dynamics of the regulator circuit 50.1, 50.2, 50.3 as well as the total energy provided as active power instantaneous reserve may be influenced via the slope df/dP of the characteristic curve 60. The higher the slope is selected, the higher the maximum amount of the active power instantaneous reserve for a given frequency change.

The slope df/dP of the characteristic curve 60 may be used to adjust how fast the inverters 10.1, 10.2, 10.3 track their respective inverter phase angle of the grid phase in the very first moment during an instantaneous power flow. A low (flat) slope df/dP means that the respective output frequency of the inverters 10.1, 10.2, 10.3 is changed comparatively little even at high power flow, so that the phase angle differential may become comparatively large and insofar comparatively much instantaneous reserve energy is exchanged. In the case of a high slope df/dP, on the other hand, the output frequency is adjusted relatively quickly to the grid frequency, so that the phase angle differential remains comparatively small and less instantaneous energy is exchanged. Specifically, the power supply plant 11 may be configured, for example, in such a way, by suitable design of the energy storages 18.1, 18.2, 18.3 in relation to the rated power of the inverters 10.1, 10.2, 10.3, that the full rated power of the power supply plant 11 is available as active power instantaneous reserve for a period of at least one second. Alternatively, other designs are possible, for example, if a grid operator of the AC voltage grid 24 requires a larger or smaller contribution to the support of the AC voltage grid 24 by the power supply plant 11.

Figure 5:
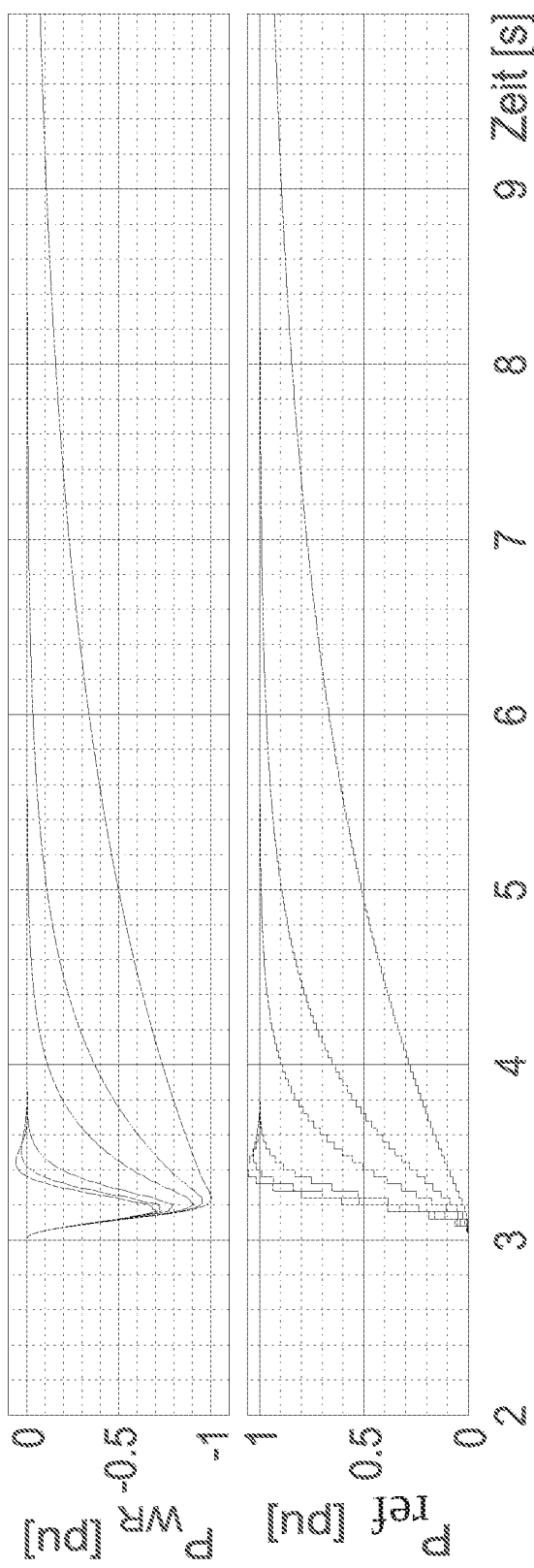
FIG. 5 shows, by way of example, various time profiles of the interchange power of an inverter as well as the reference power.

The upper half of FIG. 5 shows an example of the interchange power of an inverter 10.1, 10.2, 10.3 after the occurrence of a frequency differential during the provision of an active power instantaneous reserve according to the disclosure. In the lower half of FIG. 5 the profile of the reference power $P_{ref}$ is plotted, as it is adjusted as parameter of the droop regulator circuits 50.1, 50.2, 50.3 of the inverters 10.1, 10.2, 10.3. The different profiles of the reference power $P_{ref}$ thereby correspond to different amplification factors $1/H_\theta$ of the integrator circuit 28.2 and thus to different intervention dynamics in the droop regulator circuits 50.1, 50.2, 50.3 by the plant controller 28 (cf. FIG. 2b) or in the inverter 10.1, 10.2, 10.3 itself (cf. FIGS. 2c and 2d). It can be seen that the interchange power $P_{WR}$ initially increases in magnitude from zero due to a frequency deviation occurring at time t=3 s, the slope being given by the specific choice of the slope df/dP (cf. FIG. 4; the sign of the interchange power is arbitrary depending on the counting direction).

Triggered by the resulting deviation of the total interchange power from a specified value and insofar with a slight delay to the occurrence of a frequency differential, the reference power $P_{ref}$ is changed with different slopes from zero to approximately nominal power (1 pu), in particular by means of the integrator circuit 28.2. This first intercepts the initial magnitude increase in interchange power at a value between half nominal power (−0.5 pu) and nominal power (−1 pu), and as it progresses, the interchange power changes in proportion to the change in the reference power $P_{ref}$ so that the interchange power is regulated back to zero. The steps visible in the lower half of FIG. 5 correspond to the cycles of the plant control of the plant controller 28, which is updated at (significantly) greater intervals than the reference power by the respective regulator circuits 50.1, 50.2, 50.3 of the inverters 10.1, 10.2, 10.3.

In embodiments of the disclosure, the parameters $1/H_\theta$ or $1/H_U$ and/or df/dP or dU/dQ may be adjustable. Here, an inertia of the inverter phase angle $\theta_{set}$ with respect to the grid voltage phase angle depends on the product of the gain $1/H_\theta$ and the slope df/dP of the droop characteristic curve 60 at the droop element 52.1. In addition, damping of the synchronization of the inverter phase angle $\theta_{set}$ with the grid voltage phase angle may be adjusted via the ratio between gain factor $1/H_\theta$ and slope df/dP. Alternatively, or additionally, an inertia of the inverter voltage amplitude $U_{set}$ with respect to the grid voltage amplitude may be adjustable via the product of gain factor $1/H_U$ and slope dU/dQ at the droop element 58.13 as well as a damping of the synchronization of the inverter voltage amplitude $U_{set}$ with the grid voltage amplitude via the ratio between gain factor $1/H_U$ and slope $dU/dQ$.

The parameters $1/H_\theta$ or $1/H_U$ and/or $df/dP$ or $dU/dQ$ may be adjusted once before commissioning the power supply plant 11 with the inverters 10.1, 10.2, 10.3 and, if necessary, the plant controller 28. Alternatively, or additionally, the parameters may be changed during operation, for example via the plant controller 28 or from a higher-level operation control circuit 80. For example, this allows the dynamic behavior of the power supply plant 11 to be adapted to the current demand for control power and, for example, the ratio between instantaneous reserve and primary control power to be adjusted. In order to avoid instabilities of the regulation of the power supply plant 11 and/or the AC voltage grid 24 in case of significant changes of this ratio, the adjustment of the respective parameters $1/H_\theta$, $1/H_U$, $df/dP$ or $dU/dQ$ for the modification of inertia and/or damping may be performed via a low-pass filter with adjustable time constant or via a ramp with adjustable slope.

Figure 6:
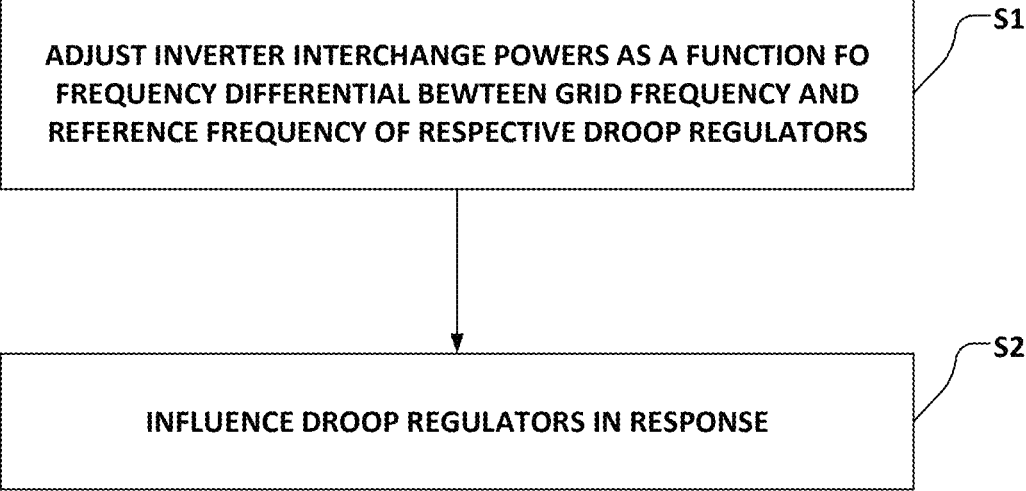
FIG. 6 shows a method for operating a power supply plant.

FIG. 6 shows a method of operating the power supply plant 11 described above. At S1, the inverters 10.1, 10.2, 10.3 adjust, by means of their respective droop regulator circuits 50.1, 50.2, 50.3, their respective interchange powers, respectively, as a function of the respective frequency differential between the grid frequency and the respective reference frequency $f_{ref}$ of their droop regulator circuits 50.1, 50.2, 50.3. At S2, the respective droop regulator circuits 50.1, 50.2, 50.3 of the respective inverters 10.1, 10.2, 10.3 are influenced. The influence at S2 may, for example, comprise a change of the reference power $P_{ref}$ and/or the reference frequency $f_{ref}$ used in the droop regulator circuits 50.1, 50.2, 50.3 as a function of the power differential between the total interchange power and a specified interchange power.

In one embodiment, a power supply plant 11 may be configured to provide instantaneous reserve power. Such a power supply plant 11 may then be configured to exchange constant power or no power with the AC voltage grid 24 when the grid frequency is constant, for example, when the grid frequency and the reference frequency are equal. Only when a frequency change and/or a phase jump occurs do the respective regulator circuits 50.1, 50.2, 50.3 intervene in a grid-forming manner, resulting in a change in the power exchange of the inverters 10.1, 10.2, 10.3 with the AC voltage grid 24 (act S1). Due to the detection of this change in power, the grid-forming function is influenced and the total interchange power of the power supply plant 11 is returned, with specifiable intervention dynamics, to zero or another specified value, in particular to the value of the interchange power before the change in frequency.

It is also possible that the interchange power of the inverters is not equal to zero due to other specifications even if the grid frequency and the respective reference frequency are equal, for example, in order to charge the energy storages 18.1, 18.2, 18.3 together or individually in a targeted manner. Then, the instantaneous reserve at S1 is provided in addition to this already given interchange power. Further, it is possible that the specified interchange power changes during the execution of acts S1, S2, so that at the end of act S2 a changed output power flows via the grid connection compared to the output state before S1.

Figure 7:
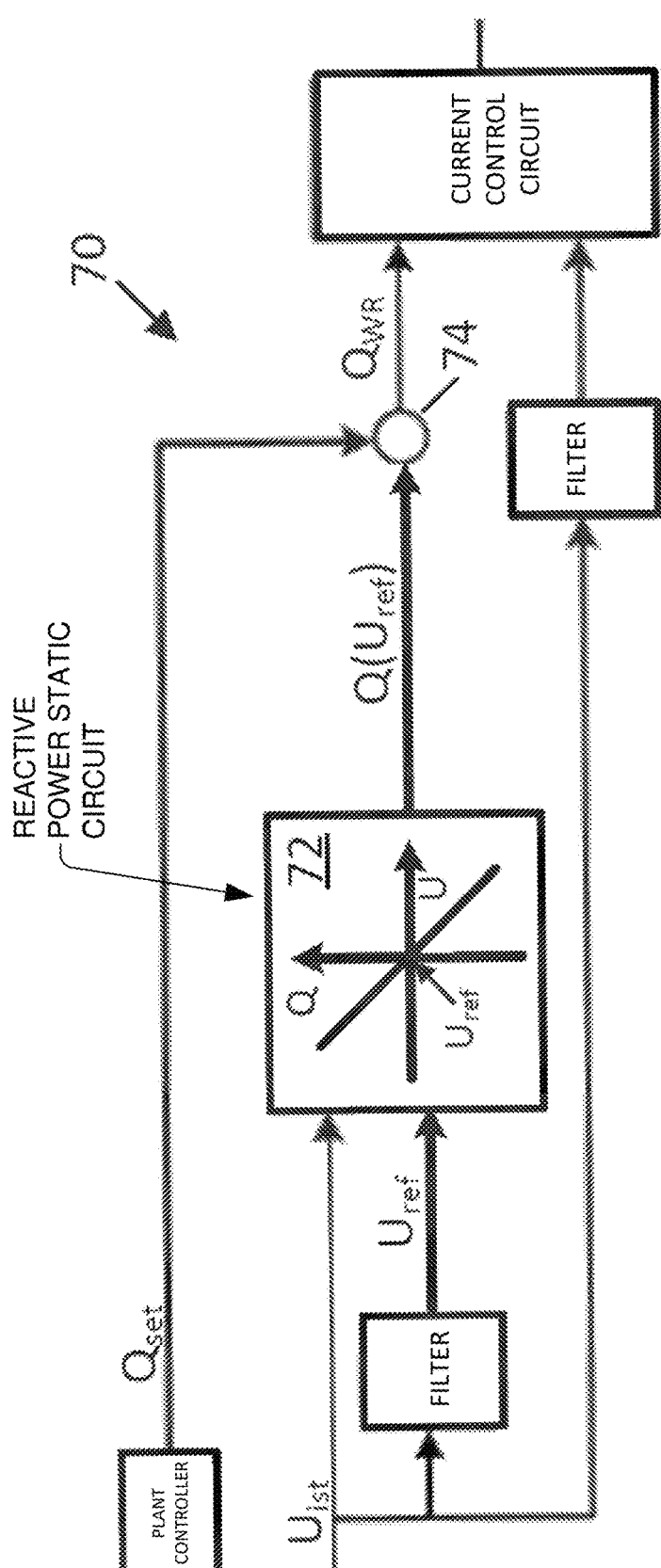
FIG. 7 shows, by way of example, a schematic representation of a further regulation of an inverter.

FIG. 7 shows a reactive power regulator 70 that may be used as an alternative or in addition to the operation of the power supply plant 11. In this case, the reactive power regulator 70 may be executed in the inverters 10.1, 10.2, 10.3 by being integrated into the regulator 50.1 or by being implemented separately.

The reactive power regulator 70 receives a measured value of the instantaneous grid voltage $U_{is}$, for example from the respective measuring device 14.1, 14.2, 14.3 of the inverter 10.1, 10.2, 10.3. In a filter 71, a dynamic reference voltage $U_{ref}$ is determined from the grid voltage $U_{is}$, which in particular may correspond to a time average value of the grid voltage $U_{is}$ and in one embodiment may be generated by a low-pass filter. A dynamic reactive power contribution $Q(U_{ref})$ is determined from the grid voltage $U_{is}$ by a reactive power static circuit 72. The reactive power static circuit 72 has a slope $dQ/dU$ and assigns the value zero to the reference voltage $U_{ref}$ for the reactive power contribution $Q(U_{ref})$.

The reactive power regulator circuit 70 receives a reactive power set point $Q_{set}$ from the plant controller 28. In an adder 74, the reactive power contribution $Q(U_{ref})$ and the reactive power set point $Q_{set}$ are summed and transferred as reactive power set point $Q_{WR}$ to a current control circuit 75 of the inverter 10.1, 10.2, 10.3. The current control circuit 75 generates suitable drive signals for the respective bridge circuit 12.1, 12.2, 12.3 of the respective inverter 10.1, 10.2, 10.3 from the reactive power set point $Q_{WR}$, taking into account the grid voltage $U_{is}$ optionally filtered in the filter circuit 76.

Figure 8:
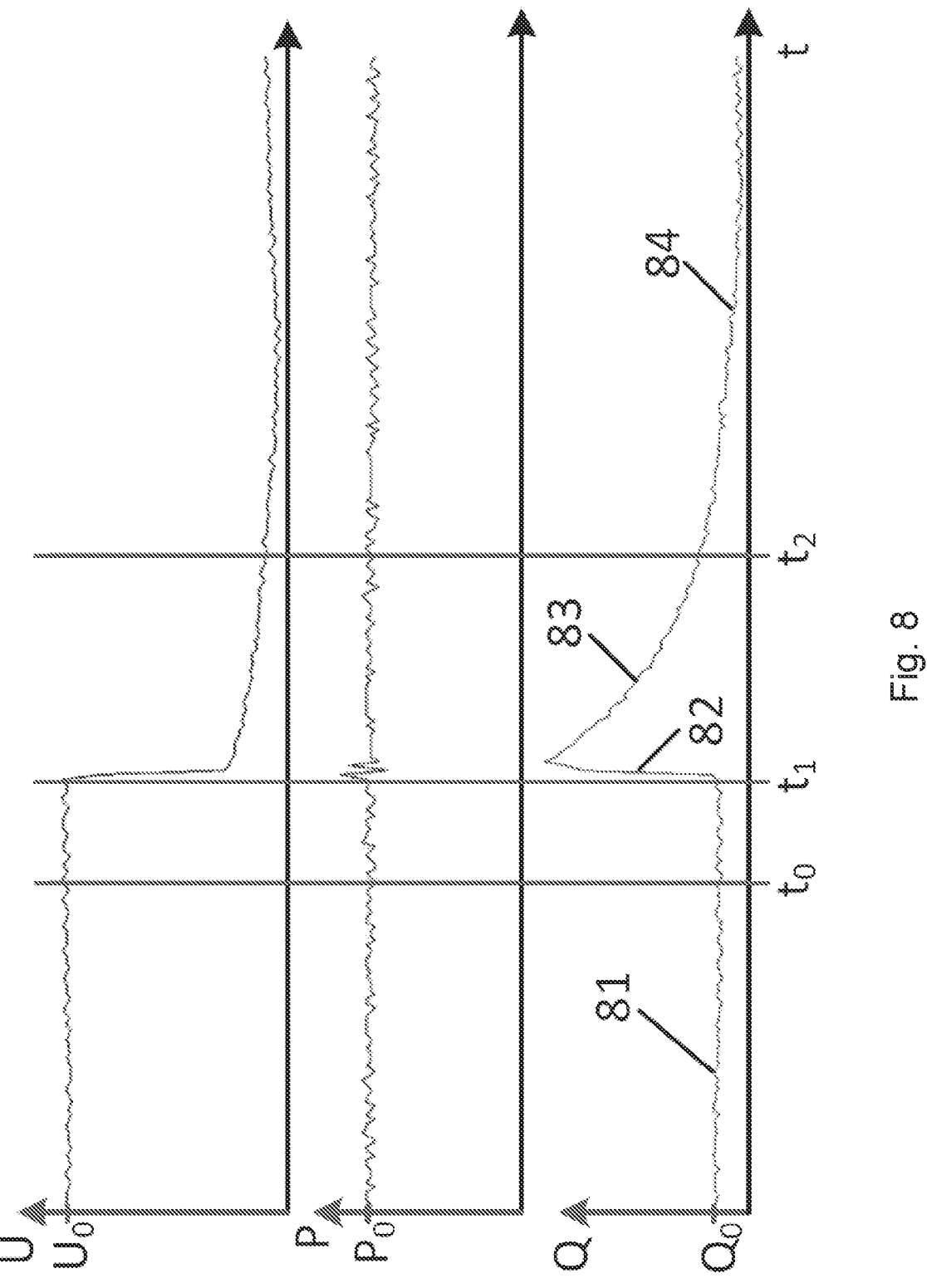
FIG. 8 shows, by way of example, various profiles of the grid voltage, the active power and the reactive power of an inverter.

FIG. 8 shows example time profiles of active power P and reactive power Q of an inverter 10.1, 10.2, 10.3 with a reactive power regulator circuit 70 according to FIG. 7. At time $t_0$, the grid voltage has a value $U_0$ and the inverter 10.1, 10.2, 10.3 exchanges active power $P_0$ and reactive power $Q_0$ with the AC voltage grid 24. In this largely stationary situation, the reactive power $Q_0$ has the profile 81 and essentially corresponds to the reactive power set point $Q_{set}$, which is specified to the inverter 10.1, 10.2, 10.3 by the plant controller 28, wherein the grid voltage $U_{is}$ in the reactive power regulator 70 corresponds to the reference voltage $U_{ref}$ and the reactive power contribution $Q(U_{ref})$ has the value zero due to the reactive power static 72.

At time t1, there is a sudden change in the grid voltage U. This causes a deviation of the grid voltage $U_{is}$ from the reference voltage $U_{ref}$ in the reactive power regulator circuit 70, which reacts delayed to the voltage jump at time $t_1$ due to the filter circuit 71. The reactive power static circuits 72 outputs a reactive power contribution $Q(U_{ref})$ based on the deviation of the grid voltage $U_{is}$ from the reference voltage $U_{ref}$, which is summed with the reactive power set point $Q_{set}$. This leads to a steep increase of the reactive power set point $Q_{WR}$, so that the inverter 10.1, 10.2, 10.3 performs a significant change of the reactive power Q (see profile 82 in FIG. 8).

The reactive power Q reaches a maximum value and is subsequently returned to the original value $Q_0$ with the profile 83 by bringing the reference voltage $U_{ref}$ closer to the changed grid voltage U by means of the filter circuit 71. For example, at time $t_2$ the reference voltage $U_{ref}$ deviates only slightly from the grid voltage U, so that the reactive power static circuit 72 specifies a comparatively small reactive power contribution $Q(U_{ref})$ and the reactive power deviates only slightly from the reactive power set point $Q_{set}$ (corresponding to $Q_0$ in FIG. 8). Finally, the reactive power Q has the profile 84, wherein the plant controller 28 may also react to the change in the grid voltage and may specify a (slightly) different reactive power set point $Q_{set}$ compared to the time $t_0$.

Both the maximum value of the reactive power Q at a given change of the grid voltage U and the duration of the decay of the reactive power contribution $Q(U_{ref})$ may be adjusted by suitable parameterization of the filter circuit 71.

In contrast to conventional reactive power regulators, which specify a constant reactive power at constant grid voltage depending on the deviation of the grid voltage from a fixed reference value and also react comparatively slowly to changes in the grid voltage, the reactive power regulator circuit 70 may be adjusted dynamically in such a way that within a few milliseconds after a change in the grid voltage, a reactive power instantaneous reserve is provided by the inverter 10.1, 10.2, 10.3, which is subsequently fed back to the value specified by the plant controller 28 with an adjustable time constant. In this case, the reactive power regulator circuit 70 is decoupled from the reactive power set point $Q_{set}$ of the plant controller 28 and only has a temporary voltage-supporting effect, in particular in the event of transient changes in the grid voltage, by providing a reactive power instantaneous reserve.

What is claimed is:

1. A method for operating a power supply plant having a plurality of inverters and a plant controller, which is communicatively connected to the inverters, wherein the power supply plant has a grid connection which is connected to an AC voltage grid, and wherein the plurality of inverters exchange electrical interchange powers with the AC voltage grid via the grid connection, so that the power supply plant exchanges a total interchange power with the AC voltage grid which is composed of the respective electrical interchange powers, wherein the inverters adjust their respective interchange powers by means of a respective regulator circuit based on a respective voltage profile deviation of a voltage profile of a grid voltage from a respective reference profile based on a respective reference frequency, wherein the respective voltage profile deviation comprises a phase angle differential between a grid phase angle of the grid voltage and a respective inverter phase angle, wherein the plant controller influences regulator circuits of the plurality of inverters based on a power differential between the total interchange power and a specified interchange power, such that the power differential is minimized by the plant controller by influencing the regulator circuits, wherein a power exchange with respective energy storages connected to the respective inverters are controlled such that a respective specifiable state of charge of the respective energy storages is targeted to 50% of a capacity of the respective energy storages, with charging or discharging of the energy storages being carried out with lower average power than a maximum interchange power due to the respective regulation of the interchange power as a function of a respective deviation of the respective phase angle differential.

2. The method according to claim 1, wherein the electrical interchange powers of the plurality of inverters comprise an active power (P) and a reactive power (Q), wherein the total interchange power of the power supply plant comprises an active power component and a reactive power component, and wherein the specified interchange power comprises an active power component and/or a reactive power component.

3. The method according to claim 2, wherein the active power component and/or the reactive power component of the specified interchange power is constant.

4. The method according to claim 2, wherein the active power component of the specified interchange power depends on a grid frequency and/or the reactive power component of the specified interchange power depends on the grid voltage.

5. The method according to claim 1, wherein intervention dynamics of the plant controller are slower than dynamics of the respective regulators of the plurality of inverters.

6. The method according to claim 1, wherein the voltage profile deviation comprises a frequency differential between a grid frequency and a respective reference frequency, wherein the grid frequency is determined from the grid voltage, and wherein active power (P) is adjusted by the respective regulator circuit as a function of the frequency differential.

7. The method of claim 1, wherein the inverter phase angle has a frequency, which may be specified by means of the respective regulator as a function of respective active power, taking into account a respective reference active power and a respective reference frequency.

8. The method according to claim 1, wherein the inverters adjust their respective active power (P) on the basis of a respective characteristic curve, wherein a parameter of the respective characteristic curve depends on the respective reference frequency (fref) and/or a parameter of the characteristic curve depends on a respective reference power (Pref), and wherein the characteristic curve has a respective slope (df/dP, dP/df), and wherein the characteristic curve in the respective regulator circuit specifies a functional relationship between the respective active power (P) and a respective frequency differential, wherein the respective active power (P) in the respective regulator circuit is used as a measured variable and the frequency and/or a phase angle of an output voltage of the respective inverter are set as a manipulated variable.

9. The method according to claim 8, wherein the plant controller adjusts the respective active power (P) by influencing the parameter of the respective characteristic curve, which depends on the respective reference frequency (fref), and/or the parameter, which depends on the respective reference power (Pref), in such a way that an active power component of the total interchange power of the power supply plant is approximated to the active power component of the specified interchange power with a specifiable time constant.

10. The method according to claim 8, wherein the parameter of the respective characteristic curve, which depends on the respective reference frequency (fref), is influenced in such a way that the respective reference frequency (fref) is matched to a low-pass filtered grid frequency measured at the grid connection.

11. The method according to claim 8, wherein the respective reference frequencies (fref) and/or the respective reference powers (Pref) of the inverters are the same and are transmitted by the plant controller to the inverters, wherein the transmission takes place in particular by broadcast.

12. The method according to claim 8, wherein the respective reference frequencies (fref) and/or the respective reference powers (Pref) differ between the inverters and are transmitted to the inverters by the plant controller.

13. The method according to claim 1, wherein the power differential is transmitted from the plant controller to the inverters, and the respective reference frequencies (fref) and/or the respective reference powers (Pref) in the regulator circuits of the inverters are changed as a function of the received power differential.

14. The method according to claim 1, wherein a level of an active power instantaneous reserve, which is provided by the power supply plant for a given voltage profile deviation, is adjusted with respect to its maximum power and its energy by specifying parameters of the regulator circuits of the plurality of inverters and/or by specifying the parameters of the plant controller.

15. The method according to claim 1, wherein dynamics of the respective regulator circuits of the plurality of inverters are adjusted by specifying a respective slope of a characteristic curve by the plant controller.

16. The method according to claim 1, wherein
intervention dynamics are adjusted in the regulator circuits by specifying parameters of an integral controller or a PI controller which uses the power differential as an input variable and outputs a reference power (Pref).

17. The method according to claim 1, wherein the respective plurality of inverters exchange reactive power with the AC voltage grid, wherein the respective regulator circuit is configured to influence the interchange power when an apparent power limit of the respective inverter is reached in such a way that reactive power exchanged with the AC voltage grid is reduced and an active power exchanged with the AC voltage grid is increased.

18. The method according to claim 1, wherein a reactive power component of the total interchange power at the grid connection is adjusted as a function of a measured voltage at the grid connection.

19. A method for operating a power supply plant having a plurality of inverters and a plant controller, which is communicatively connected to the inverters,
wherein the power supply plant has a grid connection which is connected to an AC voltage grid, and wherein the inverters exchange electrical interchange power with the AC voltage grid via the grid connection, so that the power supply plant exchanges a total interchange power with the AC voltage grid which is composed of the respective electrical interchange powers each comprising an active power (P) and a reactive power (Q),
wherein respective reactive power of the inverters is adjusted by the plant controller and a reactive power regulator in the respective inverter in dependence on a respective voltage amplitude differential between a respective grid voltage and a respective reference voltage, wherein the adjustment of the reactive power component of the total interchange power at the grid connection comprises at least the following acts carried out by the plant controller:
determining a reactive power component of the interchange power at the grid connection as a function of the AC grid voltage,
measuring the reactive power component at the grid connection,
determining respective reactive power set points for the inverters as a function of the reactive power component of the specified interchange power and the measured reactive power component at the grid connection,
transmitting the respective reactive power set points to the plurality of inverters;
and the following acts executed by the plurality of inverters:
measuring the respective grid voltage at the respective output of the inverters,
comparing the respective measured AC grid voltage to a reference voltage corresponding to an average value of the AC grid voltage,
determining a respective reactive power correction value as a function of a deviation of the measured AC grid voltage from the reference voltage by a Q-U characteristic curve,
adjusting the respective reactive power based on a sum of the respective reactive power set point and the respective reactive power correction value.

20. A method for operating an inverter in a power supply plant, the power supply plant having a grid connection which is connected to an AC voltage grid, and the inverter exchanging electrical interchange power comprising active power and reactive power with the AC voltage grid via the grid connection, the inverter adjusting its interchange power by means of a regulator circuit as a function of a voltage profile deviation of a voltage profile of a grid voltage from a reference profile based on a reference frequency (fref), a specified parameter of the regulator circuit being varied as a function of a power differential between the interchange power of the power supply plant at the grid connection and a specified interchange power,
wherein the power differential is measured outside the inverter in a plant controller, and is transmitted to the inverter, wherein the inverter determines a reference power (Pref) from the power differential using an integrator circuit,
wherein the integrator circuit has an amplifier circuit having a gain factor ($1/H\theta$), and
wherein the gain factor ($1/H\theta$) of the integrator circuit is adjustable.

21. The method according to claim 20, wherein intervention dynamics of varying the specified parameter of the regulator circuit is slower than control dynamics of the interchange power, such that the regulator circuit responds more quickly with changes in the interchange power to variations in the grid voltages than with changes in the specified parameter to changes in the power differential.

22. The method according to claim 20, wherein the regulator circuit of the inverter comprises a droop regulator, wherein the droop regulator uses the active power (P) as a measured variable and, using a characteristic curve with a slope (df/dP), adjusts the frequency and/or a phase angle of an output voltage of the inverter as a manipulated variable, a specified parameter of the characteristic curve being dependent on the reference frequency (fref) and/or a specified parameter of the characteristic curve being dependent on a reference power (Pref), the reference frequency (fref) and/or the reference power (Pref) being varied as a function of the power differential.

23. The method according to claim 20, wherein the reference frequency (fref) is varied such that the reference frequency (fref) is matched with a low-pass filtered grid frequency measured at the grid connection.

24. The method according to claim 22, wherein the slope (df/dP) of the droop regulator is adjustable.

25. The method according to claim 24, wherein an inverter phase angle ($\theta$set) has an inertia with respect to a grid voltage phase angle that is adjustable by a product of the gain factor ($1/H\theta$) and the slope (df/dP).

26. The method according to claim 25, wherein a synchronization of the inverter phase angle ($\theta$set) with the grid voltage phase angle has a damping that is adjustable by a ratio of the gain factor ($1/H\theta$) to the slope (df/dP).

27. The method according to claim 26, wherein the inertia and/or the damping of the inverter phase angle ($\theta$set) is adjustable during ongoing operation of the power supply plant, and wherein, in order to adjust inertia and/or damping, the gain factor (1/Hθ) and/or the slope (df/dP) are adjustable via a low-pass filter with adjustable time constant or via a ramp with adjustable slope.

28. A method for operating an inverter in a power supply plant, the power supply plant having a grid connection which is connected to an AC voltage grid, wherein the inverter exchanges electrical interchange power comprising active power ad reactive power with the AC voltage grid via the grid connection and adjusts its interchange power by means of a regulator circuit as a function of a voltage amplitude differential between a grid voltage and a reference voltage, wherein the regulator circuit of the inverter comprises a grid-following reactive power regulator, which comprises:

measuring the grid voltage (Uis), determining a reactive power correction value (Q(Uref)) as a function of the deviation of the grid voltage from a reference voltage (Uref) using a Q-U characteristic curve, adjusting the reactive power (Q) based on the sum of the reactive power component in the specified interchange power and a respective reactive power correction value (Q(Uref)), wherein the reference voltage (Uref) is varied as the specified parameter of the Q-U characteristic curve in such a way that the reactive power (Q) of the inverter is approximated to the reactive power component of the specified interchange power with a specifiable time constant, by a reactive power correction value (Q(Uref)) approaching zero.

* * * * *